United States Patent
Claessen et al.

(10) Patent No.: US 12,141,702 B2
(45) Date of Patent: Nov. 12, 2024

(54) AUTOMATED SEMANTIC SEGMENTATION OF NON-EUCLIDEAN 3D DATA SETS USING DEEP LEARNING

(71) Applicant: PROMATON HOLDING B.V., Amsterdam (NL)

(72) Inventors: Frank Theodorus Catharina Claessen, Amsterdam (NL); David Anssari Moin, Amsterdam (NL); Teo Cherici, Amsterdam (NL); Farhad Ghazvinian Zanjani, Amsterdam (NL)

(73) Assignee: PROMATON HOLDING B.V., Amsterdam (NL)

( * ) Notice: Subject to any disclaimer, the term of this patent is extended or adjusted under 35 U.S.C. 154(b) by 420 days.

(21) Appl. No.: 17/415,465

(22) PCT Filed: Dec. 17, 2019

(86) PCT No.: PCT/EP2019/085819
§ 371 (c)(1),
(2) Date: Jun. 17, 2021

(87) PCT Pub. No.: WO2020/127398
PCT Pub. Date: Jun. 25, 2020

(65) Prior Publication Data
US 2022/0067943 A1    Mar. 3, 2022

(30) Foreign Application Priority Data
Dec. 17, 2018    (EP) .................... 18213246

(51) Int. Cl.
| | |
|---|---|
| *G06N 3/084* | (2023.01) |
| *G06F 18/21* | (2023.01) |
| *G06F 18/22* | (2023.01) |
| *G06F 18/2431* | (2023.01) |
| *G06T 7/00* | (2017.01) |
| *G06T 7/11* | (2017.01) |

(Continued)

(52) U.S. Cl.
CPC ......... *G06N 3/084* (2013.01); *G06F 18/2185* (2023.01); *G06F 18/22* (2023.01);
(Continued)

(58) Field of Classification Search
None
See application file for complete search history.

(56) References Cited

U.S. PATENT DOCUMENTS

| | | |
|---|---|---|
| 6,721,387 B1 | 4/2004 | Naidu et al. |
| 7,987,099 B2 | 7/2011 | Kuo et al. |

(Continued)

FOREIGN PATENT DOCUMENTS

| | | |
|---|---|---|
| CN | 101977564 A | 2/2011 |
| CN | 106618760 A | 5/2017 |

(Continued)

OTHER PUBLICATIONS

Hermosilla et al., Monte Carlo Convolution for Learning on Non-Uniformly Sampled Point Clouds, arXiv:1806.01759v2 [cs.CV] Sep. 25, 2018 (Year: 2018).*

(Continued)

*Primary Examiner* — Soo Shin
(74) *Attorney, Agent, or Firm* — Steven M. Koehler; Westman, Champlin & Kochler, P.A.

(57) ABSTRACT

A computer-implemented method for semantic segmentation of a point cloud comprises receiving a cloud having points representing a vector of an object, preferably part of a dento-maxillofacial structure having a dentition; determining subset(s) including a first number of points arranged around a selected point of the cloud and a second number of points arranged at spatial distances larger than a predetermined spatial distance of the first number of points, the first number of points representing fine feature(s) of the object around the selected point and the second number of points (Continued)

representing object global feature(s); providing each subset of points to a deep neural network, DNN, the DNN being trained to semantically segment points of each subset according to classes associated with the object; and, for each subset point, receiving a DNN output multi-element vector, wherein each element represents a probability that the point belongs to class(es) of the object.

20 Claims, 11 Drawing Sheets

(51) Int. Cl.
    *G06V 10/26*      (2022.01)
    *G06V 10/44*      (2022.01)
    *G06V 10/764*     (2022.01)
    *G06V 10/82*      (2022.01)
    *G06V 20/64*      (2022.01)

(52) U.S. Cl.
    CPC ........ *G06F 18/2431* (2023.01); *G06T 7/0012* (2013.01); *G06T 7/11* (2017.01); *G06V 10/26* (2022.01); *G06V 10/454* (2022.01); *G06V 10/764* (2022.01); *G06V 10/82* (2022.01); *G06V 20/64* (2022.01); *G06T 2200/04* (2013.01); *G06T 2207/10028* (2013.01); *G06T 2207/20076* (2013.01); *G06T 2207/20081* (2013.01); *G06T 2207/20084* (2013.01); *G06T 2207/30036* (2013.01)

(56) References Cited

U.S. PATENT DOCUMENTS

| | | | |
|---|---|---|---|
| 8,099,305 B2 | 1/2012 | Kuo et al. | |
| 8,135,569 B2 | 3/2012 | Matov et al. | |
| 8,439,672 B2 | 5/2013 | Matov et al. | |
| 8,639,477 B2 | 1/2014 | Cheinokov et al. | |
| 9,107,722 B2 | 8/2015 | Matov et al. | |
| 9,135,498 B2 | 9/2015 | Andreiko et al. | |
| 9,904,999 B2 | 2/2018 | Andreiko et al. | |
| 10,032,271 B2 | 7/2018 | Somasundaram et al. | |
| 10,235,606 B2 | 3/2019 | Miao et al. | |
| 10,456,229 B2 | 10/2019 | Fisker et al. | |
| 10,610,185 B2 | 4/2020 | Taguchi et al. | |
| 10,685,259 B2 | 6/2020 | Salah et al. | |
| 10,932,890 B1 | 3/2021 | Sant et al. | |
| 10,997,727 B2 | 5/2021 | Xue et al. | |
| 11,007,036 B2 | 5/2021 | Pokotilov et al. | |
| 11,107,218 B2 | 8/2021 | Salah et al. | |
| 2005/0019732 A1* | 1/2005 | Kaufmann | G06T 7/12 433/213 |
| 2005/0192835 A1 | 9/2005 | Kuo et al. | |
| 2008/0085487 A1 | 4/2008 | Kuo et al. | |
| 2008/0253635 A1 | 10/2008 | Spies et al. | |
| 2009/0191503 A1 | 7/2009 | Matov et al. | |
| 2010/0069741 A1 | 3/2010 | Kuhn et al. | |
| 2011/0038516 A1 | 2/2011 | Koehler et al. | |
| 2011/0081071 A1 | 4/2011 | Benson et al. | |
| 2011/0255765 A1 | 10/2011 | Carlson et al. | |
| 2012/0063655 A1 | 3/2012 | Dean et al. | |
| 2013/0022251 A1 | 1/2013 | Chen et al. | |
| 2013/0039556 A1 | 2/2013 | Kachelriess et al. | |
| 2013/0230818 A1 | 9/2013 | Matov et al. | |
| 2014/0169648 A1 | 6/2014 | Andreiko et al. | |
| 2014/0227655 A1 | 8/2014 | Andreiko et al. | |
| 2015/0029178 A1 | 1/2015 | Claus et al. | |
| 2016/0008095 A1 | 1/2016 | Matov et al. | |
| 2016/0034788 A1* | 2/2016 | Lin | G06V 10/764 382/157 |
| 2016/0042509 A1 | 2/2016 | Andreiko et al. | |
| 2016/0078647 A1 | 3/2016 | Schildkraut et al. | |
| 2016/0117850 A1 | 4/2016 | Jin et al. | |
| 2016/0324499 A1 | 11/2016 | Sen Sharma et al. | |
| 2016/0371862 A1 | 12/2016 | Silver et al. | |
| 2017/0024634 A1 | 1/2017 | Miao et al. | |
| 2017/0046616 A1 | 2/2017 | Socher et al. | |
| 2017/0100212 A1 | 4/2017 | Sherwood et al. | |
| 2017/0150937 A1 | 6/2017 | Stille et al. | |
| 2017/0169562 A1 | 6/2017 | Somasundaram et al. | |
| 2017/0265977 A1 | 9/2017 | Fisker et al. | |
| 2017/0270687 A1 | 9/2017 | Manhart | |
| 2018/0005377 A1* | 1/2018 | Alvarez | G06T 7/74 |
| 2018/0028294 A1* | 2/2018 | Azernikov | G06F 18/24143 |
| 2018/0110590 A1 | 4/2018 | Maraj et al. | |
| 2018/0182098 A1 | 6/2018 | Andreiko et al. | |
| 2018/0253866 A1* | 9/2018 | Jain | G06F 18/2431 |
| 2018/0300877 A1 | 10/2018 | Somasundaram et al. | |
| 2019/0026599 A1 | 1/2019 | Salah et al. | |
| 2019/0147245 A1 | 5/2019 | Qi et al. | |
| 2019/0147666 A1 | 5/2019 | Keustermans et al. | |
| 2019/0148005 A1 | 5/2019 | Domracheva et al. | |
| 2019/0164288 A1 | 5/2019 | Wang et al. | |
| 2019/0172200 A1 | 6/2019 | Andreiko et al. | |
| 2019/0282333 A1 | 9/2019 | Matov et al. | |
| 2019/0328489 A1 | 10/2019 | Capron-Richard et al. | |
| 2020/0015948 A1 | 1/2020 | Fisker et al. | |
| 2020/0022790 A1 | 1/2020 | Fisker | |
| 2020/0085535 A1 | 3/2020 | Pokotilov et al. | |
| 2020/0179089 A1 | 6/2020 | Serval et al. | |
| 2020/0320685 A1 | 10/2020 | Anssari Moin et al. | |
| 2021/0045843 A1 | 2/2021 | Pokotilov et al. | |
| 2021/0082184 A1 | 3/2021 | Claessen et al. | |
| 2021/0110584 A1 | 4/2021 | Claessen et al. | |
| 2021/0150702 A1 | 5/2021 | Claessen et al. | |
| 2021/0174543 A1 | 6/2021 | Claessen et al. | |
| 2021/0217233 A1 | 7/2021 | Feng et al. | |
| 2021/0264611 A1 | 8/2021 | Xue et al. | |
| 2021/0322136 A1 | 10/2021 | Anssari Moin et al. | |
| 2023/0186476 A1* | 6/2023 | Ghazvinian Zanjani | G06V 10/82 706/20 |
| 2023/0263605 A1* | 8/2023 | Madden | A61C 13/34 264/16 |

FOREIGN PATENT DOCUMENTS

| | | |
|---|---|---|
| CN | 108205806 A | 6/2018 |
| CN | 108305684 A | 7/2018 |
| EP | 2742857 A1 | 6/2014 |
| EP | 3121789 A1 | 1/2017 |
| EP | 3462373 A1 | 4/2019 |
| EP | 3591616 A1 | 1/2020 |
| EP | 3671531 A1 | 6/2020 |
| EP | 3767521 A1 | 1/2021 |
| JP | 2007-525289 A | 9/2007 |
| JP | 2010-220742 A | 10/2010 |
| JP | 2013-537445 A | 10/2013 |
| JP | 2017-102622 A | 6/2017 |
| JP | 2017-520292 A | 7/2017 |
| JP | 2017-157138 A | 9/2017 |
| JP | 2022-501299 A | 1/2022 |
| WO | 2015169910 A1 | 11/2015 |
| WO | 2016143022 A1 | 9/2016 |
| WO | 2017099990 A1 | 6/2017 |
| WO | 2019002616 A1 | 1/2019 |
| WO | 2019002631 A1 | 1/2019 |
| WO | 2019068741 A2 | 4/2019 |
| WO | 2019122373 A1 | 6/2019 |
| WO | 2019207144 A1 | 10/2019 |
| WO | 2020007941 A1 | 1/2020 |
| WO | 2020048960 A1 | 3/2020 |
| WO | 2021009258 A1 | 1/2021 |

OTHER PUBLICATIONS

Atzmon et al., "Point Convolutional Neural Networks by Extension Operators," arXiv:1803. 10091v1 [cs.CV] Mar. 27, 2018 (Year: 2018).*

(56) References Cited

OTHER PUBLICATIONS

Ahn, B. "The Compact 3D Convolutional Neural Network for Medical Images, Jul. 2, 2017, pp. 1-9, http://cs231n.standord.edu/reports/2017/pdfs/23/pdf, retrieved Dec. 18, 2018.".

Auro Tripathy, "Five Insights from GoogLeNet You Could Use In Your Own Deep Learning Nets", Sep. 20, 2016, pages 1-21, https://www.slideshare.net/aurot/googlenet-insights?from_action=save, retrieved Dec. 18, 2018.

Bustos et al. "An Experimental Comparison of Feature-Based 3D Retrieval Methods" 2nd International Symposium on 3D Data Processing, Visualization, and Transmission, 3DPVT 2004, Sep. 6-9, 2004, pp. 215-222.

Chaouch, M. and Verroust-Blondet, A. "Alignment of 3D Models", Graphical Models, Mar. 2009, pp. 63-76, vol. 71, No. 2.

Chen et al. "Deep RBFNet: Point Cloud Feature Learning Using Radial Basis Functions", Cornell University Library, Dec. 11, 2018, 11 pages.

Chen et al. "Fast Resampling of 3D Point Clouds Via Graphs", IEEE Transactions on Signal Processing, Feb. 1, 2018, pp. 666-681, vol. 66, No. 3.

Çiçek et al. "3D U-Net: Learning Dense Volumetric Segmentation from Sparse Annotation", Medical Image Computing and Computer-Assisted Intervention—MICCAI 2016, Part II, Oct. 2, 2016, pp. 424-432.

Duda et al. "Pattern Classification: Introduction", 2001, Pattern Classification, New York, John Wiley & Sons, US, pp. 1-13.

Duy et al. "Automatic Detection and Classification of Teeth in CT Data", International Conference on Medical Image Computing and Computer-Assisted Intervention—MICCAI 2012, 2012, pp. 609-616.

Eun, H. and Kim, C. "Oriented Tooth Localization for Periapical Dental X-ray Images via Convolutional Neural Network", Asia-Pacific Signal and Information Processing Association Annual Summit and Conference (APSIPA), Dec. 3, 2016, pp. 1-7.

Everingham et al. "The PASCAL Visual Object Classes (VOC) Challenge", International Journal of Computer Vision, Sep. 9, 2009, pp. 303-338, vol. 88, No. 2.

Fang et al. "3D Deep Shape Descriptor", 2015 IEEE Conference on Computer Vision and Pattern Recognition (CVPR), 2015, pp. 2319-2328.

Fechter et al. "A 3D Fully Convolutional Neural Network and a Random Walker to Segment the Esophagus in CT", Apr. 21, 2017, 23 pages, https://arxiv.org/pdf/1704.06544.pdf, retrieved Dec. 18, 2018.

Ghafoorian et al. "EL-GAN: Embedding Loss Driven Generative Adversarial Networks for Lane Detection", Computer Vision—ECCV 2018 Workshops, Jan. 23, 2019, pp. 256-272, vol. 11129.

Ghazvinian Zanjani et al. "Deep Learning Approach to Semantic Segmentation in 3D Point Cloud Intra-oral Scans of Teeth", Proceedings of the 2nd International Conference on Medical Imaging with Deep Learning, 2019, 22 pages, retrieved online from https://openreview.net/forum?id=ByxLSoblgV.

Gkantidis et al. "Evaluation of 3-Dimensional Superimposition Techniques on Various Skeletal Structures of the Head Using Surface Models", PLoS One, Feb. 23, 2015, 20 pages, vol. 10, No. 2.

Gjesteby et al. "Deep Learning Methods for CT Image-Domain Metal Artifact Reduction", SPIE, Developments in X-Ray Tomography XI, Sep. 25, 2017, 6 pages, vol. 10391.

Gomes et al. "Efficient 3D Object Recognition Using Foveated Point Clouds", Computers & Graphics, May 1, 2013, pp. 496-508, vol. 37.

Gorler, O. and Akkoyun, S. "Artificial Neural Networks Can be Used as Alternative Method to Estimate Loss Tooth Root Sizes for Prediction of Dental Implants", Cumhuriyet University Faculty of Science Science Journal (CSJ), Apr. 2017, pp. 385-395, vol. 38, No. 2.

Guo et al. "3D Mesh Labeling Via Deep Convolutional Neural Networks", ACM Transactions on Graphics, Dec. 2015, pp. 1-12, vol. 35, No. 1, Article 3.

Hall, P. and Owen, M. "Simple Canonical Views", Proceedings of the British Machine Vision Conference (BMVC), Sep. 2005, 10 pages.

Han et al. "Deep Residual Learning for Compressed Sensing CT Reconstruction Via Persistent Homology Analysis", Cornell University Library, Nov. 19, 2016, pp. 1-10.

He et al. "Deep Residual Learning for Image Recognition", 2016 IEEE Conference on Computer Vision and Pattern Recognition (CPR), Jun. 2016, pp. 770-778.

Hermosilla et al. "Monte Carlo Convolution for Learning on Non-Uniformly Shaped Point Clouds", ACM Transactions on Graphics, Nov. 2018, 12 pages, vol. 37, No. 6, Article 235.

Hongming Li, Y. "Non-Rigid Image Registration Using Fully Convolutional Networks With Deep Self-Supervision", Sep. 3, 2017, 8 pages.

Hou et al. "3D-SIS: 3D Semantic Instance Segmentation of RGB-D Scans", Computer Vision and Pattern Recognition (CPR), Apr. 29, 2019, 14 pages.

Huang et al. "Edge-Aware Point Set Resampling", ACM Transactions on Graphics, 2013, pp. 1-12, vol. 32, No. 1, Article 9.

Isola et al. "Image-to-Image Translation with Conditional Adversarial Networks", 2017 IEEE Conference on Computer Vision and Pattern Recognition (CVPR), Honolulu, HI, 2017, pp. 5967-5976.

Joda, T. and Gallucci, G. "Systematic Literature Review of Digital Three-Dimensional Superimposition Techniques to Create Virtual Dental Patients", The International Journal of Oral & Maxillofacial Implants, 2015, pp. 330-337, vol. 30, No. 2.

Johari et al. "Detection of Vertical Root Fractures in Intact and Endodontically Treated Premolar Teeth by Designing a Probabilistic Neural Network: An ex vivo Study", Dentomaxillofacial Radiology, Feb. 2017, vol. 46, No. 2, pp. 1-9.

Jung et al. "Combining Volumetric Dental CT and Optical Scan Data for Teeth Modeling", Computer-Aided Design, Oct. 2015, pp. 24-37, vol. 67-68.

Klinder et al. "Automated Model-Based Vertebra Detection, Identification, and Segmentation in CT Images", Medical Image Analysis, Jun. 2009, pp. 471-482, vol. 13, No. 3.

Ku et al. "Joint 3D Proposal Generation and Object Detection from View Aggregation", IEEE/RSJ International Conference on Intelligent Robots and Systems (IROS), Jul. 12, 2018, pp. 1-8.

Le T. and Duan Y. "PointGrid: A Deep Network for 3D Shape Understanding", Proceedings of the IEEE Conference on Computer Vision and Pattern Recognition, Jun. 18-23, 2018, pp. 9204-9214.

Li et al. "PointCNN: Convolution On X-Transformed Points", Neural Information Processing Systems (NIPS), Nov. 5, 2018, 11 pages.

Li et al. "SO-Net: Self-Organizing Network for Point Cloud Analysis", Eye In-Painting with Exemplar Generative Adversarial Networks, Jun. 2018, pp. 9397-9406.

Liao et al. "Automatic Tooth Segmentation of Dental Mesh Based on Harmonic Fields", Biomedical Research International, 2015, 10 pages, vol. 2015.

Litjens et al. "A Survey on Deep Learning in Medical Image Analysis", Medical Image Analysis, Dec. 2017, pp. 60-88, vol. 42.

Liu, C. and Furukawa, Y. "MASC: Multi-scale Affinity with Sparse Convolution for 3D Instance Segmentation", Computer Vision and Pattern Recognition (CPR), Feb. 12, 2019, 4 pages.

Meyer et al. "Normalized Metal Artifact Reduction (NMAR) in Computed Tomography", Medical Physics, Oct. 2010, pp. 5482-5493, vol. 37, No. 10.

Miki et al. "Classification of Teeth in Cone-Beam CT Using Deep Convolutional Neural Network", Computers in Biology and Medicine, Jan. 2017, pp. 24-29, vol. 1, No. 80.

Miki et al. "Tooth Labeling in Cone-Beam CT Using Deep Convolutional Neural Network for Forensic Identification", SPIE 10134, Medical Imaging 2017: Computer-Aided Diagnosis, Mar. 3, 2017, 6 pages.

Pavaloiu et al. "Automatic Segmentation for 3D Dental Reconstruction", IEEE 6th ICCCNT, Jul. 13-15, 2015.

Pavaloiu et al. "Neural Network Based Edge Detection for CBCT Segmentation", 5th IEEE EHB, Nov. 19-21, 2015.

(56) References Cited

OTHER PUBLICATIONS

Qi et al. "Frustum PointNets for 3D Object Detection from RGB-D Data", Computer Vision and Pattern Recognition (CPR), Apr. 13, 2018, 15 pages.

Qi et al. "PointNet++: Deep Hierarchical Feature Learning on Point Sets in a Metric Space", Conference on Neural Information Processing Systems (NIPS), Jun. 2017, 14 pages.

Qi et al. "PointNet: Deep Learning on Point Sets for 3D Classification and Segmentation", Computer Vision and Pattern Recognition (CVPR), 2017, 19 pages.

Ravanbakhsh et al. "Deep Learning With Sets and Point Clouds", Feb. 24, 2017, 12 pages, retrieved online from https://arxiv.org/abs/1611.04500.

Ruellas et al. "3D Mandibular Superimposition: Comparison of Regions of Reference for Voxel-Based Registration" PLoS One, Jun. 23, 2016, 13 pages.

Ryu et al. "Analysis of Skin Movement With Respect to Flexional Bone Motion Using MR Images of a Hand", Journal of Biomechanics, 2006, pp. 844-852, vol. 39, No. 5.

Schulze et al. "Artefacts in CBCT: A Review", Dentomaxillofacial Radiology, Jul. 1, 2011, pp. 265-273, vol. 40, No. 5.

Sekuboyina et al. "A Localisation-Segmentation Approach for Multi-Label Annotation of Lumbar Vertebrae Using Deep Nuts", Cornell University Library, 201 Olin Library Cornell University Ithaca, NY 14853, Mar. 13, 2017, 10 pages.

Silva et al. "Automatic Segmenting Teeth in X-Ray Images: Trends, A Novel Data Set, Benchmarking and Future Perspectives", Feb. 9, 2018, 33 pages, retrieved online from https://arxiv.org/pdf/1802.03086.pdf.

Simonovsky et al. "A Deep Metric for Multimodal Registration" International Conference on Medical Image Computing and Computer-Assisted Intervention (MICCAI), 2016, pp. 10-18, vol. 9902.

Skrodzki et al. "Directional Density Measure to Intrinsically Estimate and Counteract Non-Uniformity in Point Clouds", Computer Aided Geometric Design, Aug. 2018, pp. 73-89, vol. 64.

Shaoqing et al. "Mask R-CNN", Proceedings of the IEEE International Conference on Computer Vision, 2017, pp. 2961-2969.

Szegedy et al. "Going Deeper With Convolutions", 2015 IEEE Conference on Computer Vision and Pattern Recognition (CVPR), Jun. 2015, pp. 1-9.

Tian, S. "Automatic Classification and Segmentation of Teeth on 3D Dental Model Using Hierarchical Deep Learning Networks" IEEE Journals & Magazine, Jun. 21, 2019, pp. 84817-84828.

Tonioni et al. "Learning to Detect Good 3D Keypoints", International Journal of Computer Vision, 2018, pp. 1-20, vol. 126.

Wang et al. "Dynamic Graph CNN for Learning on Point Clouds", ACM Trans. Graph, Jan. 2019, vol. 1, No. 1, 13 pages.

Wang et al. "SGPN: Similarity Group Proposal Network for 3D Point Cloud Instance Segmentation", CVF Conference on Computer Vision and Pattern Recognition, Nov. 23, 2017, 13 pages.

Wu et al. "Tooth Segmentation on Dental Meshes Using Morphologic Skeleton", Computers & Graphics, Feb. 2014, pp. 199-211, vol. 38.

Wu et al. "3D ShapeNets: A Deep Representation for Volumetric Shapes", 2015 IEEE Conference on Computer Vision and Pattern Recognition (CVPR), 2015, pp. 1912-1920.

Wu et al. "Model-Based Teeth Reconstruction", ACM Transactions on Graphics (TOG), ACM, US, Nov. 11, 2016, pp. 1-13, vol. 35, No. 6.

Xu et al. "SpiderCNN: Deep Learning on Point Sets with Parameterized Convolutional Filters", Computer Vision—EECV, 2018, 16 pages.

Yau et al. "Tooth Model Reconstruction Based Upon Data Fusion for Orthodontic Treatment Simulation", Computers In Biology and Medicine, May 1, 2014, pp. 8-16, vol. 48.

Yi et al. "GSPN: Generative Shape Proposal Network for 3D Instance Segmentation in Point Cloud", Proceedings of the IEEE/CVF Conference on Computer Vision and Pattern Recognition (CVPR), 2019, 13 pages.

Yu, Y. "Machine Learning for Dental Image Analysis", Nov. 2016, 61 pages, https://arxiv.org/ftp/arxiv/papers/1611/1611.09958.pdf, retrieved Nov. 30, 2017.

Zhang, Y. and Yu, H. "Convolutional Neural Network Based Metal Artifact Reduction in X-Ray Computed Tomography", IEEE Transactions on Medical Imaging, Jun. 2018, pp. 1370-1381, vol. 37, No. 6.

Zhang, C. and Xing, Y. "CT Artifact Reduction Via U-Net CNN", Spie, Medical Imaging 2018: Image Processing, Mar. 2, 2018, 6 pages, vol. 10574.

Zhou et al. "A Method for Tooth Model Reconstruction Based on Integration of Multimodal Images", Journal of Healthcare Engineering, Jun. 20, 2018, vol. 8, pp. 1-8.

Non-published U.S. Appl. No. 17/626,744, filed Jan. 12, 2022.

International Search Report and Written Opinion for corresponding International Application No. PCT/EP2019/085819 dated Sep. 3, 2020.

Gutierrez-Becker et al. "Learning Optimization Updates for Multimodal Registration", Medical Image Computing and Computer-Assisted Intervention—MICCAI 2016, 2016, pp. 19-27.

Hosntalab et al. "A Hybrid Segmentation Framework for Computer-Assisted Dental Procedures", IEICE Transactions on Information and Systems, Oct. 2009, pp. 2137-2151, vol. E92D, No. 10.

Studholme et al. "Automated Three-Dimensional Registration of Magnetic Resonance and Positron Emission Tomography Brain Images by Multiresolution Optimization of Voxel Similarity Measures", Medical Physics, 1997, pp. 25-35, vol. 24. No. 1.

Kamnitsas et al. "Efficient Multi-scale 3D CNN With Fully Connected CRF for Accurate Brain Lesion Segmentation", Medical Image Analysis, 2017, pp. 61-78, vol. 36.

Office Action in corresponding Israel Patent Application Ser. No. 283988 dated Aug. 9, 2023.

Hamida et al. "Deep Learning for Semantic Segmentation of Remote Sensing Images with Rich Spectral Content", 2017 IEEE International Geoscience and Remote Sensing Symposium (IGARSS), 2017, pp. 2569-2572.

Office Action in corresponding Japanese application No. 2021-534797 dated Nov. 6, 2023.

Office Action in corresponding Japanese application No. 2021-534797 dated Jul. 25, 2024.

\* cited by examiner

AUTOMATED SEMANTIC SEGMENTATION OF NON-EUCLIDEAN 3D DATA SETS USING DEEP LEARNING

CROSS-REFERENCE TO RELATED APPLICATION(S)

This Application is a Section 371 National Stage Application of International Application No. PCT/EP2019/085819, filed Dec. 17, 2019, and published as WO 2020/127398 A1 on Jun. 25, 2020, and further claims priority to European Application Ser. No. 18213246.4, filed Dec. 17, 2018.

FIELD OF THE INVENTION

The invention relates to automated semantic segmentation of non-Euclidean 3D data sets using deep learning, and, in particular, though not exclusively, to systems and methods for semantic segmentation of non-Euclidean 3D data sets using deep learning, a method for training such deep learning neural network, and a computer program product for using such method.

BACKGROUND OF THE INVENTION

The emergence of digital equipment for extra-oral imaging (e.g. X-ray panoramic, cephalometric and cone beam computed tomography) and intra-oral imaging (e.g. laser or structured light projection scanners) has been a driving force for developing computer-aided dental treatment systems that are capable of analyzing different sources of image data, typically 3D image data, of a patient and extract useful clinical information therefrom. Such systems may support one or more clinical workflows for e.g. for implantology and/or orthodontics, so that the system is able to determine a dental treatment plan or to assist in determining a dental treatment plan. 3D CT scans provide very useful information, but the resolution of these scans cannot provide the accuracy and detail that is required for optimal dental planning in areas where accurate and detailed information about a dentition and more general the dento-maxillofacial structure of a patient is essential. Hence, in that case one would like to rely on more accurate data sources such as high-resolution 3D data representations of scanned surfaces of teeth and gingiva (gums) determined by an intra-oral scanner.

Accurate automated semantic segmentation of such 3D data representations is an essential feature for a dental treatment system and includes assignment of a label based on the Federation Dentaire Internationale (FDI) standard to each data point, e.g. labelling all points belonging to a specific tooth crown. The FDI specifies 32 labels, referring to e.g. 16 teeth in each upper and lower jaw as may be present in a healthy adult. Hence, the problem involves finding a plurality of classes (e.g. 16 or 32 classes plus one for the gingiva) in a large 3D data set. When building an accurate 3D dental model based on 3D data sets representing dentitions a number of problems may occur. One problem relates to the dentition (the arrangement of teeth on the dental arch) wherein the appearance of two adjacent tooth crowns (e.g. two molar teeth) are very similar. Therefore, assigning a correct label to points in the 3D data set requires additional information such as the relative position of one tooth with respect to one or more other teeth on the dental arch. Furthermore, the presence of abnormalities in the dentition (e.g. the absence of one or more teeth) and/or shape deformation, makes automated semantic segmentation of 3D data representing dentition a challenging task for a computer. Further problems are related to the data acquisition like partially missing data (e.g. because of occlusion during scanning), lack of a universal coordinate system, presence of noise, outliers, etc.

Extra-oral imaging data, such as 3D X-ray data, are typically provided in Euclidean type format, e.g. a voxel representation wherein the voxels wherein each voxel is associated with a predetermined position in a 3D grid. Systems that are capable of performing semantic segmentation (taxonomy) on voxelized CBCT data using deep learning are known in the art. For example, in the article by Miki et al, "Classification of teeth in cone-beam CT using deep convolutional neural network", Computers in Biology and Medicine 80 (2017) pp. 24-29, a 2D deep convolutional neural network system is described that was trained to classify 2D CBCT images of teeth into 7 different tooth types. Euclidean type 3D data sets such as voxelized 3D data representations are particular suitable for processing by a trained deep neural network as the voxel representation both provides local information and global information (e.g. information about voxels relative to a particular voxel representation) about features in the data set.

3D data sets, e.g. point cloud or surfaces meshes, generated by an intra-oral scanning equipment however are of the non-Euclidean type. For example, in a point cloud representation each point may be represented by a 3D vector in a 3D Cartesian coordinate system which is not universal (i.e. the Cartesian coordinate system can be different between two IOS data sets). Similarly, in a surface mesh representation, three points may define a triangular surface, which builds a 3D surface mesh. A normal vector associated with the triangular surface defines an orientation in the 3D space. Non-Euclidean data sets, such as point clouds and surface meshes, are irregular, permutation-invariant and have a variable number of points per sample. For that reason, Non-Euclidean data sets, e.g. raw point cloud data, cannot be directly applied to a conventional deep learning models (e.g. convolutional neural network, CNN) for image analysis, such as segmentation.

Different approaches have been proposed to deal with non-Euclidean data sets. For example, US2017/0169562 describes a system for automatic tooth type recognition on the basis of intra-oral optical 3D scans. 3D surface meshes of each crown are generated and used to determine aggregated features for each tooth. These features are then used as training data for training classifiers making use of traditional machine learning methodologies such as support vector machines or decision trees. A similar feature-based approach was made by (Guo et al., 2015; Fang et al., 2015) wherein set of standard shape features (e.g. based on computer graphic algorithms) is extracted from the point cloud and subsequently a neural network (e.g. a CNN) is used to classify the features. The performance of such feature based approach is limited to the discriminating properties of the handcrafted features (Qi et al., 2017). In the volumetric approach the object represented by the point could is voxelized and used for forming a 3D model based on a 3D CNN (Wu et al., 2015; Qi et al., 2016). The process of spatial quantization of the information of the point cloud into voxels however limits the performance of the model, especially when fine, high-frequency details of the point cloud representation need to be preserved in shape curvatures for accurate prediction.

Point cloud deep learning models are configured to directly receive and process raw point clouds. Each point may have some attributes, e.g. the 3D coordinates and sometimes other attributes like the normal of the surface, color, etc. Point cloud deep learning does not exhibit some of the shortcomings that are related to handcrafted features, quantization errors or high processing demands, associated with the aforementioned approaches. Several studies on point cloud analysis by deep neural networks (DNNs) for object classification and/or segmentation tasks have been published. PointNet (Qi, et al., Pointnet: Deep learning on point sets for 3d classification and segmentation. Proc. Computer Vision and Pattern Recognition (CVPR), IEEE, 1(2):4, 2017.) and DeepSets (Ravanbakhsh, et al. Deep learning with sets and point clouds. arXiv preprint arXiv: 1611.04500, 2016) are deep neural networks based on so-called multi-layer perceptron (MLP) networks. The performance of these MLP networks was improved by Le and Duan. (Pointgrid: A deep network for 3d shape understanding. In Proceedings of the IEEE Conference on Computer Vision and Pattern Recognition, pages 9204-9214, 2018). based on techniques for the handling the above-mentioned data irregularity and permutation invariance. Additionally, a resampling technique was used for fixing the number of points that are offered to the input of the neural network. Although such approach is suitable for many applications, it is not suitable for classifying a point cloud representing fine high-resolution details (e.g. classifying a point close to the borderline of a tooth and gingiva).

The above-mentioned problems make accurate semantic segmentation of large high-resolution point clouds based on deep learning very challenging. Hence, there is a need in the art for improved methods for semantic segmentation of non-Euclidean 3D data sets, e.g. point cloud, using deep learning.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including a functional or an object oriented programming language such as Java™, Scala, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer, server or virtualized server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), or graphics processing unit (GPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In a first aspect, the invention relates to a computer-implemented method for semantic segmentation of a point cloud comprising: receiving a point cloud, the point cloud including points representing a vector in a 3D space, the points representing a predetermined object; determining one or more subsets of the point cloud using a non-uniform resampling algorithm, each of the one or more subsets including a first number of points densely arranged within a predetermined spatial distance of a selected point of the point cloud and a second number of points sparsely arranged at spatial distances larger than the predetermined spatial distance, the first number of point representing one or more fine features of the object around the selected point and the second number of points representing one or more global features of the object; providing each of one or more subsets of points to the input of a deep neural network, DNN, the deep neural network being trained to semantically segment points of each of the one or more subsets that is provided to the input of the DNN according to a plurality of classes associated with the object; and, for each point of the subset that is provided to the input of the DNN, receiving at the output of the DNN a multi-element vector, wherein each element of the vector represents a probability that the point belongs to one of the plurality of classes of the object.

In an embodiment, the first number of points being larger than the second number of points.

A point cloud typically comprises more points than the amount that can be processed at once by the neural network. To obtain a complete segmentation of all points in the point cloud the point cloud may be sampled into multiple subsets of points. These subsets are individually segmented, and their resulting segmentations can be combined to form the complete point cloud segmentation. Due to the division into the subsets, contextual information about global features in the point cloud is lost.

To deal with this problem non-uniform resampling is used to resample a subset of points from the point cloud which then can be fed directly to the input of the deep neural network of the segmentation module. The non-uniform resampling is needed in order to deal with the size of the cloud points sets. Further, it is needed for dealing with the data irregularity, the permutation-invariance and the variable number of points of different point cloud sets. The non-uniform resampling algorithm generates a locally-dense and globally-sparse subset of points. This way, a subset of points defines a fixed-size resampled point cloud which contains different levels of spatial resolution, involving both local, fine details and the global shape structure. These fine details and global shape information may be used for training a deep neural network. The non-uniform resampling may facilitate training and deployment of deep learning approach to semantic segmentation of e.g. 3D Point Cloud IOS the network on a fixed-size resampled point cloud which comprises different levels of spatial resolution, involving both local, fine details and the global shape structure. In an embodiment, the object may be part of a dento-maxillofacial structure, the dento-maxillofacial structure including a dentition comprising teeth. The invention may be used for semantic segmentation of irregular high-resolution point cloud representations.

In an embodiment, the non-uniform resampling algorithm may include: randomly selecting a point from the point cloud; determining the first number of point by densely sampling points of the point cloud which are positioned within the predetermined distance from the randomly selected point and determining the second number of points by sparsely sampling points of the point cloud which are positioned at a distance larger than the predetermined distance from the randomly selected point; and, combining the first points and second points into a subset of points.

In an embodiment, the predetermined spatial distance may be determined based on a random number, preferably a Monte Carlo technique.

In an embodiment, the spatial distance may be based on a weighted distance metric. In an embodiment, the weighted distance metric may be based an exponential function. In a further embodiment, the weighted distance metric may define a radial basis kernel K (RBK) according to the expression:

$$\mathcal{K}(x_i, x_{fovea}) = \exp\left(-\frac{\|x_i - x_{fovea}\|^2}{2\sigma^2}\right). \quad (1)$$

where parameter σ is a free parameter that may be used to control the bandwidth of the kernel, $x_i$ is the position of point i and $x_{fovea}$ is the position of the randomly selected point.

In an embodiment, the DNN may be trained based on a training set comprising one or more point clouds, each of the one or more point clouds representing the predetermined object and each point of the one or more point clouds being associated with a target label; preferably the training of the DNN including determining subsets of the one or more point clouds using the non-uniform resampling algorithm and training the parameters of the DNN by minimizing a loss function representing a deviation between labels predicted by the DNN and the target labels.

In an embodiment, the loss function may be a weighted loss function ($L_p$), the loss function defining a weight to each point based on the distance metric. In an embodiment, the weighted distance metric may be based an exponential function, more preferably the weighted distance metric defining a radial basis kernel K (RBK) according to the expression:

$$\mathcal{K}(x_i, x_{fovea}) = \exp\left(-\frac{\|x_i - x_{fovea}\|^2}{2\sigma^2}\right). \quad (1)$$

where parameter σ is a free parameter that may be used to control the bandwidth of the kernel, $x_i$ is the position of point i and $x_{fovea}$ is the position of the randomly selected point.

In an embodiment, the DNN may be trained based on a discriminator network, wherein the discriminator network is configured to distinguish between a target label and a label generated by the DNN or between at least one feature associated with a target label and at least one feature associated with a label generated by the DNN. The point-wise cross-entropy loss for semantic segmentation of a point cloud is an ill-posed problem since the relative geometrical structure between the instances (e.g. the teeth) are not formulated. Hence, usually a heavy post-processing stage (e.g. iterative energy minimization of a constructed graph for relational modelling) have been applied. By training a secondary (deep neural) network as a discriminator in an adversarial setting and penalizing an unrealistic arrangement of assigned labels to the teeth on the dental arch, the results may be substantially improved. Experiments show improvement over the performance of the baseline network and an outperforming of the state-of-the-art by achieving an 0.94 IOU score.

In an embodiment, a feedback module randomly provides a target label or a label generated by the DNN to the input of the discriminator network and in response, the discriminator network generating an indication whether the input of the discriminator is associated a target label or a label generated by the DNN.

In a further aspect, the invention may relate to a computer-implemented method for training a deep neural network DNN to semantically segment a point cloud, the method comprising: receiving training data, the training data comprising one or more point clouds, each of the one or more point clouds representing a predetermined object, and each point of the one or more point clouds being associated with a target label, preferably the predetermined object being part of a dento-maxillofacial structure, the dento-maxillofacial structure including a dentition comprising teeth; determining subsets of the one or more point clouds of the training data using a non-uniform resampling algorithm, each of the one or more subsets being associated with target labels and each of the one or more subsets including a first number of points densely arranged within a predetermined spatial distance of a selected point of the point cloud and a second number of points sparsely arranged at spatial distances larger than the predetermined spatial distance, the first number of point representing one or more fine features of the object around the selected point and the second number of points representing one or more global features of the object; providing one of the one or more subset to the input of the DNN and receiving from the output of the DNN and for each point of the subset that is provided to the input of the DNN, receiving at the output of the DNN a multi-element vector, wherein each element of the vector represents a probability that the point belongs to one of the plurality of classes of the object; and, training the parameters of the DNN by minimizing a loss function representing a deviation between labels predicted by the DNN and the target labels.

In an embodiment, the non-uniform resampling algorithm may include: randomly selecting a point from the point cloud; determining the first number of point by densely sampling points of the point cloud which are positioned within the predetermined distance from the randomly selected point and determining the second number of points by sparsely sampling points of the point cloud which are positioned at a distance larger than the predetermined distance from the randomly selected point; and, combining the first points and second points into a subset of points.

In an embodiment, the loss function may be a weighted loss function ($L_p$), the loss function defining a weight to each point based on the distance metric, preferably the weighted distance metric being based an exponential function, more preferably the weighted distance metric defining a radial basis kernel K (RBK) according to the expression:

$$\mathcal{K}(x_i, x_{fovea}) = \exp\left(-\frac{\|x_i - x_{fovea}\|^2}{2\sigma^2}\right), \quad (1)$$

where parameter σ is a free parameter that may be used to control the bandwidth of the kernel, $x_i$ is the position of point i and $x_{fovea}$ is the position of the randomly selected point.

In an embodiment, the DNN may be trained based on a discriminator network, the discriminator network being configured to distinguish between a target label and a label generated by the DNN or between at least one feature associated with a target label and at least one feature associated with a label generated by the DNN.

In an embodiment, the method may comprise: a feedback module randomly providing a target label or a label generated by the DNN to a feature extraction module; the feature extraction module determining one or more features based on the received target label or label generated by the DNN and providing the one or more features to the input of the discriminator network; in response the discriminator network generating an indication whether the one or more features are associated a target label or a label generated by the DNN; providing the indication to the input of the DNN.

In addition to a point-wise classification loss, an adversary loss may be used for training the DNN in an adversarial setting. This way, the segmentation network is empowered to learn the realistic layout of the labelling space and improving the classification of points by involving the high-level semantics and preserving the valid arrangement of the teeth labels on the dental arch.

In a further aspect, the invention may relate to a computer system, preferably a server system, adapted to semantically segment of a point cloud comprising: a computer readable storage medium having computer readable program code embodied therewith, the program code including a non-uniform sampling module and at least a trained deep neural network DNN, the computer readable program code; and a processor, preferably a microprocessor, coupled to the computer readable storage medium, wherein responsive to executing the first computer readable program code, the processor is configured to perform executable operations may comprise: receiving a point cloud, the point cloud including points representing a vector in a 3D space, the points representing a predetermined object, preferably part of a dento-maxillofacial structure, the dento-maxillofacial structure including a dentition comprising teeth; determining one or more subsets of the point cloud using a non-uniform resampling algorithm, each of the one or more subsets including a first number of points densely arranged within a predetermined spatial distance of a selected point of the point cloud and a second number of points sparsely arranged at spatial distances larger than the predetermined spatial distance, the first number of point representing one or more fine features of the object around the selected point and the second number of points representing one or more global features of the object; providing each of one or more subsets of points to the input of a deep neural network, DNN, the deep neural network being trained to semantically segment points of each of the one or more subsets that is provided to the input of the DNN according to a plurality of classes associated with the object; and, for each point of the subset that is provided to the input of the DNN, receiving at the output of the DNN a multi-element vector, wherein each element of the vector represents a probability that the point belongs to one of the plurality of classes of the object.

In a yet further aspect, the invention may relate to a computer system, preferably a server system, adapted to train a deep neural network DNN to semantically segment a point cloud comprising: a computer readable storage medium having computer readable program code embodied therewith, the program code including a non-uniform sampling module and at least a trained deep neural network DNN, the computer readable program code; and a processor, preferably a microprocessor, coupled to the computer readable storage medium, wherein responsive to executing the first computer readable program code, the processor is configured to perform executable operations may comprise: receiving training data, the training data comprising one or more point clouds, each of the one or more point clouds representing a predetermined object, and each point of the one or more point clouds being associated with a target label, preferably the predetermined object being part of a dento-maxillofacial structure, the dento-maxillofacial structure including a dentition comprising teeth; determining subsets of the one or more point clouds of the training data using a non-uniform resampling algorithm, each of the one or more subsets being associated with target labels and each of the one or more subsets including a first number of points densely arranged within a predetermined spatial distance of a selected point of the point cloud and a second number of points sparsely arranged at spatial distances larger than the predetermined spatial distance, the first number of point representing one or more fine features of the object around the selected point and the second number of points representing one or more global features of the object; providing one of the one or more subset to the input of the DNN and receiving from the output of the DNN and for each point of the subset that is provided to the input of the DNN, receiving at the output of the DNN a multi-element vector, wherein each element of the vector represents a probability that the point belongs to one of the plurality of classes of the object; and, training the parameters of the DNN by minimizing a loss function representing a deviation between labels predicted by the DNN and the target labels.

In an embodiment, the DNN described above may comprise one or more multi-layer perceptron (MLP) networks and/or one or more χ-Conv operator layers of a pointCNN network. In a further embodiment, the discriminator network described above may comprise one or more multi-layer perceptron (MLP) networks. The deep neural network may be configured directly process 'raw' point cloud data. In an embodiment, the deep neural network may include a multi-layer perceptron (MLP) network. In a further embodiment, the deep neural network may be configured as a pointCNN network as described in the article by Li et al. PointCNN: convolution on χ-transformed points, arXiv:1801.07791v5 of 5 Nov. 2018 (to be published in Neural Information Processing Systems (NIPS) 2018. In an embodiment, the pointCNN network may be trained in an adversarial setting using a discriminator network providing accurate semantic segmentation of IOS data representing dentations.

The invention relates to an end-to-end deep learning framework for semantic segmentation of individual teeth as well as the gingiva from points clouds derived from IOS point clouds. By introducing a non-uniform resampling technique, the model may be trained and deployed on the highest available spatial resolution where it learns the local fine-details along with the global coarse structure of IOS.

The invention may also relate of a computer program product comprising software code portions configured for, when run in the memory of a computer, executing any of the methods as described above.

The invention will be further illustrated with reference to the attached drawings, which schematically will show embodiments according to the invention. It will be understood that the invention is not in any way restricted to these specific embodiments.

DETAILED DESCRIPTION

Figure 1A:
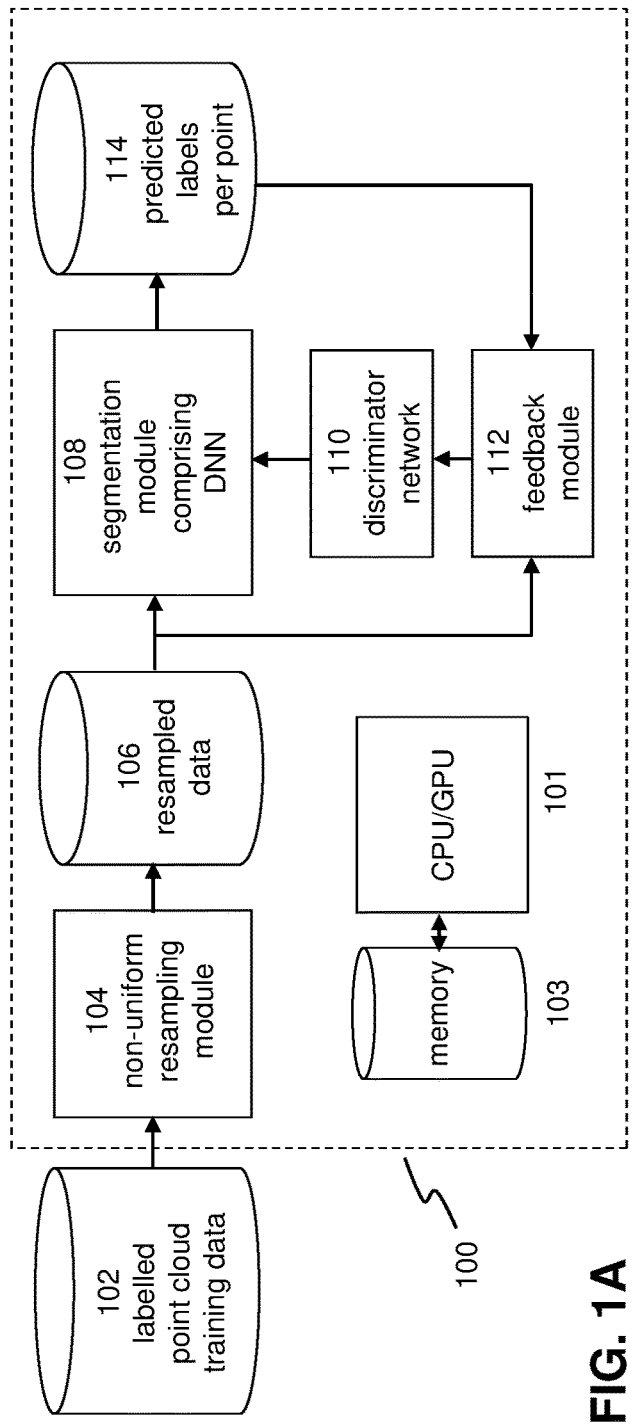
FIGS. 1A and 1B depict a system according to an embodiment of the invention.

In this disclosure embodiments are described of computer systems and computer-implemented methods that use one or more deep neural networks (DNNs) for accurate semantic segmentation of non-Euclidean 3D data sets. Here, a non-Euclidian 3D data set refers to a data set defining a 3D representation of an object, wherein the data sets comprises a collection of points and wherein each point may be represented by a vector in a 3D Cartesian coordinate system which is not universal (i.e. the Cartesian coordinate system can be different between two IOS data sets). Examples of such non-Euclidian 3D data sets include point clouds and 3D surface meshes. Here, a 3D surface mesh includes points that define a triangular surface, which collectively describe a surface mesh in a 3D space. A normal vector associated with a triangular surface defines an orientation in the 3D space. In contrast to Euclidean 3D data sets such as voxel representations, non-Euclidean data sets, such as point clouds and surface mesh representations, are irregular, permutation-invariant and may have a variable number of points per sample, a sample here intended to mean a representation of a surface, and the number of points being variable across multiple instances of recording (sampling) the same surface. In this application, the term point cloud is used to refer to any non-Euclidian 3D data set for representing an object in 3D space based on points that define a vector in a 3D space.

A computer system according to the invention may comprise at least a non-uniform resampling module for generating non-uniform samples of a point cloud (a subset of the original point cloud), wherein each sample (subset) has a constant number points and wherein the non-uniform resample includes dense local information around a certain point of the point cloud and sparse global information associated with the global shape of the object, e.g. the dentition, represented by the point cloud. Further, the computer system according to the invention may include at least a segmentation module comprising a deep neural network that is trained to receive the resampled subset of point cloud data at its input and to label each of the points of the resampled subset according to the labels of a training set. The deep neural network may be configured directly process 'raw' point cloud data. In an embodiment, the deep neural network may include a multi-layer perceptron (MLP) network. In a further embodiment, the deep neural network may be configured as a pointCNN network as described in the article by Li et al. PointCNN: convolution on $\chi$-transformed points, arXiv:1801.07791v5 of 5 Nov. 2018 (to be published in Neural Information Processing Systems (NIPS) 2018. In an embodiment, the pointCNN network may be trained in an adversarial setting using a discriminator network providing accurate semantic segmentation of IOS data representing dentations. Examples of such networks as described in more detail with reference to FIGS. 7 and 8. Non-uniformly resampled subsets of 3D point cloud labelled training data may result in a trained segmentation deep neural network that can accurately segment high-resolution point cloud data sets, such as IOS point cloud data sets representing dentitions. The computer system, the non-uniform resampling module, the segmentation module as well as the training of the neural network of the segmentation module are described hereunder in more detail.

Figure 1B:
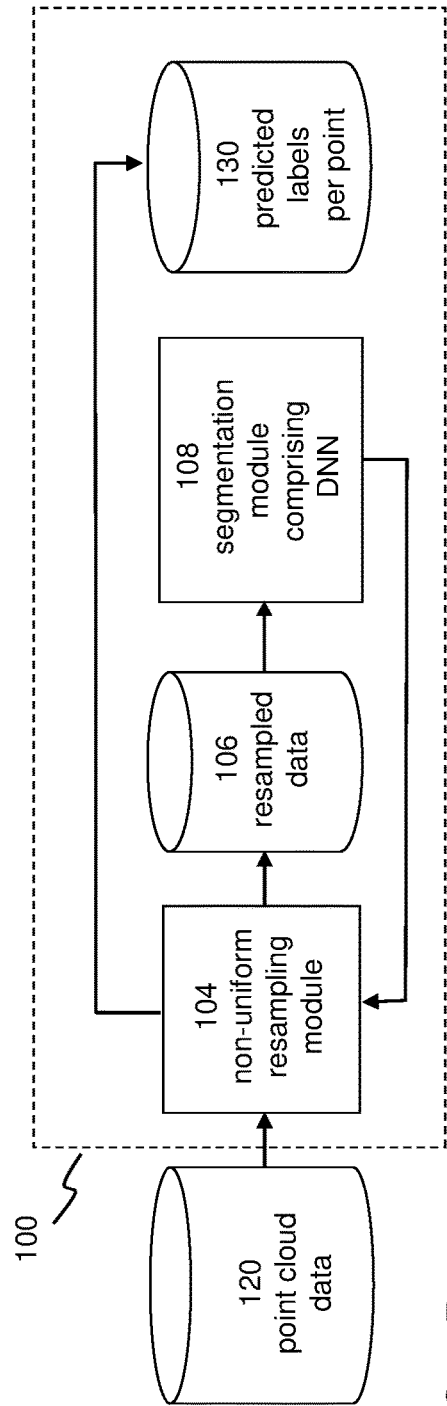

FIGS. 1A and 1B depict a system according to an embodiment of the invention. In particular, FIGS. 1A and 1B depict a system 100 for automated semantic segmentation of non-Euclidean 3D data sets, e.g. point cloud and/or 3D surface meshes. The system may be implemented on one or more computers comprising one or more processing units 101 connected to memory 103. The system may be configured to execute a plurality of modules, including 3D deep neural networks that may be trained to receive (part(s) of) one or more non-Euclidean 3D data sets as their input and process the data according to a trained model. The system may be implemented as a stand-alone system (e.g. a server system or a network application such as a cloud application) connected to data storage and retrieval system, e.g. a database system or the like, including one or more storage units e.g. databases. As shown in FIGS. 1A and 1B the system may include a non-uniform resampling module 104, a storage 106 (e.g. a buffer or a cache) for (temporarily) storing resampled data, e.g. a non-uniform resampled point cloud or 3D surface mesh data, generated by the non-uniform resampling module and a segmentation module 108 comprising a deep neural network (DNN) for semantic segmentation of the resampled data.

A point cloud typically comprises more points than the amount that can be processed at once by the neural network. To obtain a complete segmentation of all points in the point cloud the point cloud may be sampled into multiple subsets of points. These subsets are individually segmented, and their resulting segmentations can be combined to form the complete point cloud segmentation. Due to the division into the subsets, contextual information about global features in the point cloud may be.

In order to deal with this problem the non-uniform resampling module is configured to resample a subset of points from the point cloud, wherein the subset of points is of a size which can be fed directly to the input of the deep neural network of the segmentation module. The non-uniform resampling is needed in order to deal with the size of point cloud and the data irregularity, the permutation-invariance and the variable number of points of different point cloud. The non-uniform resampling algorithm may be configured to generate a locally-dense and globally-sparse subset of points. This way, the subset of points may define a fixed-size resampled point cloud which contains different levels of spatial resolution, involving both local, fine details and the global shape structure. These fine details and global shape information may be used for training a deep neural network. The non-uniform resampling is described hereunder in more detail with reference to FIG. 2 and FIG. 3.

The system may include a training modus and an inference modus. FIG. 1A depicts the system in the training modus. In this modus, the system is configured to train the DNN of the segmentation module using labelled point cloud training data 102. Once the deep neural network is trained, the inference modus of the system may be used to apply the trained 3D model to new point cloud data as shown in FIG. 1B.

As shown in FIG. 1A, in the training modus, a so-called discriminator network 110, i.e. a secondary deep neural network, may be used to assist in training the deep neural network (the generator network) of the segmentation module 108. This way, the trained neural network will be capable of accurately predicting labels 114 from resampled point cloud data 106 that are offered to the input of the segmentation module. The training data 102 may comprise a plurality of point cloud data sets, wherein each set represents a dentition. Such data may be generated by an intra-oral scanner (IOS) which is capable of generating high-resolution point cloud data. The points of each point cloud data set of the training data may be labelled based on tooth classes, the so-called target labels. For example, the target labels may be based on the Federation Dentaire Internationale (FDI) standard, which defines 32 labels, referring to 16 teeth in each upper and lower jaw in the case of a healthy adult dentition.

The training data may be augmented by various operations including: random 3D rotation, permutation and/or adding artificial noise (jitter) to the position of each point. Further, instance dropouts may be applied to the data set. Such dropout of instances here is intended to mean randomly removing all points or at least a substantial part of the points that belong to a specific tooth from the point cloud in each batch of the training data. The augmentation may help a deep neural network to learn the labels that lacking and do not occur in the training set. In an embodiment, a pre-processing step may be applied to a point cloud data set so that the data are normalized, more specifically a normalization of the vectors representing the points, such that within the point set, the data has a mean approximating 0 and a unit variance (standard deviation approaching 1 as much as possible).).

Hence, the DNN of the segmentation module 108 is trained to predict a suitable class (e.g. 16 or 32 classes plus one for the gingiva) for each point in a point cloud data set. The training data are used to iteratively update a model (represented by the network parameters, e.g. the weights, of the neural network) a large number of times. A known stochastic gradient descent optimization method may be used to learn the most beneficial values for the network parameters of the DNN by reducing the error between the output of the neural network and the correct labels. When the error rate stops decreasing the training phase of a network may be considered as completed. A predetermined loss function may be used to determine the error that is used in the stochastic gradient descent optimization method.

During training, the generator network (the DNN of the segmentation module) may receive non-uniform subsamples of the point cloud training data. Additionally, the generator network may receive feedback from a discriminator network 110. The main task of the discriminator network is to distinguish whether the predicted labels it receives as input are either labels generated by the generator network out its output or the target labels that are part of the training data. Hence, in that case, the target labels are used as a ground truth for training the generator network. The discriminator in return receives feedback if the output it has given was correct, i.e. if the point labels were indeed 'predicted' or 'real' as the discriminator indicated. This information helps the generator network to effectively learn labelling of the points of the non-uniform subsample, since both generator and discriminator learn from the given feedback.

The discriminator network is configured to distinguish between the target labels and labels that are predicted by the generator network. During training, a feedback module 112 (randomly) presents either the target labels or the output labels of the generator network to the discriminator network. In response, the discriminator network generates an indication whether the input of the discriminator is associated with 'real' labels or predicted labels generated by the generator network. The discriminator network will then generate a 'score' indicating whether the information it receives is real or corrected. For example, in an embodiment, the discriminator may have output between zero and one wherein a '1' may indicate that the information is related to target labels and a '0' may indicate that the information is associated with labels predicted by the generator network. If during training, the generator network generates predicted labels which the discriminator can distinguish from the target labels, then this will be a signal for the system that the predicted labels are not sufficiently 'realistic'. Hence, this way, the generator network will be stimulated to produce predicted labels which are similar to the target labels of the training data.

The more realistic the predictions generated by the generator network, the more challenging it is for the discriminator to distinguish between both. Hence, the ability of the discriminator to distinguish between both is a measure of the quality of the labels generated by the generator. This information may be fed back to the discriminator as well as the generator network through backpropagation. This way, the generator is trained to generate accurate labels for semantically classifying points of the resampled subset into different dental classes. The loss function used in the backpropagation method may include a point-wise classification loss and an adversarial loss for enabling the segmentation network to learn the realistic layout of the labelling space and improving the classification of points by involving the high-level semantics and preserving the valid arrangement of the teeth labels on the dental arch. The training modus of the system as well as the loss function are described hereunder in more detail with reference to FIG. 4 and FIG. 5.

In the inference modus, the system is configured to provide new point cloud data 120, e.g. an IOS point cloud representing a dentition, to the input of the non-uniform resampling module 104. Resampled data, e.g. resampled point cloud data sets 106 (representing non-uniformly resampled subset of the point cloud that was provided to the input) may be provided to the input of the segmentation module 108 wherein the trained deep neural network will predict labels for each point of the subset of points. The labelling process may be applied to different subsets of the point cloud until all points of the input point cloud are labelled by the trained neural network. The interference process and exemplary segmentation outputs of the system are described hereunder with reference to FIG. 6 and FIG. 9.

As already shortly discussed above, training a deep learning model based on all or at least a substantial part of the points of a IOS point cloud may introduce problems which are related to the nature of large-sized high-resolution point cloud data sets. For example, it would in principle require processing matrices with a variable ranking due to the fact that the number of points for different IOS data sets may vary considerably (for example between 100.000 and 500.000 points or even larger). Additionally, hardware limitations may require a maximum to the size of a point cloud that can be processed. Such problems may be solved using a patch-classification technique which is common for large-size images data sets. This technique relies on determining a number of patches (local subsets of a large data set) by resampling the point cloud and classifying each data point of each subset. The use of such technique however may degrade the classification results because the extracted patches (a local subset of the point cloud) do not provide sufficient information about the global structure of the object(s) the point cloud represents.

Thus, conventional uniform resampling of a high-resolution point cloud does not lead to an accurate analysis of the point cloud at its highest available resolution. Various non-uniform resampling methods have been proposed in order to preserve the high-frequency contents (Chen et al., 2018; Huang et al., 2013) or local directional density (Skrodzki et al., 2018). However, the effectiveness of such data abstraction methods (i.e. a reduction of data whilst preserving most relevant information) on the performance of a deep neural network is not clear. Moreover, such approach is not suitable for designing an end-to-end learning scheme, applied directly on the raw data, by leaving such an abstraction level to be performed by the network itself with respect to its objective function. It may be considered beneficial to be able to deduce the relevant abstraction based directly on the desired outcome to be generated by such network.

In order to solve the above-mentioned problems, a non-uniform resampling method based on a Monte Carlo sampling technique may be used. As will be described hereunder in greater detail, such Monte Carlo sampling techniques allow the application of non-uniform resampling methods on high-resolution point clouds resulting in a locally-dense and globally-sparse subset of points for efficiently training a deep neural network that is capable of processing such data. A point cloud may be represented as a matrix $X=[x_1, x_2, \ldots, x_N]$ with N points wherein each point may be associated with D attributes, wherein $x_i \in R^D$ and the point cloud $X \in R^{N \times D}$. Here, D=3 for 3D geometric points. Further, a radial basis kernel function (RBF) denoted by K may be defined, wherein the RBF may be positioned on a randomly chosen point. This point may be referred to as the fovea: $x_{fovea} \in X$. Then, a geometrical similarity (spatial distance) to the fovea may be determined based on a weighted distance metric. In an embodiment, the RBF kernel may be defined as follows:

$$\mathcal{K}(x_i, x_{fovea}) = \exp\left(-\frac{\|x_i - x_{fovea}\|^2}{2\sigma^2}\right), \quad (1)$$

where parameter σ is a free parameter that may be used to control the bandwidth (compactness) of the kernel. By resampling, a subset Y out of X with M1 points may be chosen (M1<N) so that dense sampling around the fovea and sparse sampling for positions further away from the fovea may be achieved. Based on the Monte Carlo sampling, by randomly selecting (with replacement) a point $x_i$ from the set X, the selected point may be inserted into subset Y only if the condition K($x_i$, $x_{fovea}$)>$r_\delta$ is satisfied. If the condition is not satisfied the point is rejected. The variable $r_\delta$ may be a random number selected from a uniform distribution in the unity interval as defined by the applicable Monte Carlo technique. This resampling process may continue until M1−1 unique points are accepted. Table 1 depicts an example of a non-uniform resampling algorithm:

TABLE 1 pseudo code of an exemplary non-uniform resampling algorithm
Algorithm 1: Non-uniform resampling

```
input : point cloud
output: non-uniform resampled point cloud
X ← {x₁, x₂, ..., x_N}            // whole point cloud
Y ← ∅                              // initialized empty set
x_f ← x ∈ X                        // randomly draw one sample as fovea
Function ℛ(x_i, X):
|  while |Y| < M do
|  |  x_i ← x ∈ X                 // randomly draw sample
|  |  δ ~ uniform (0, 1)           // draw a random value
|  |  if 𝒦(x_i, x_f) ≥ δ then
|  |  |  if x_i ∉ Y then
|  |  |  |  Y ← x_i ∪ Y            // insert to the subset
|  |  |  end
|  |  end
|  end
|  return Y
```

Figure 2:
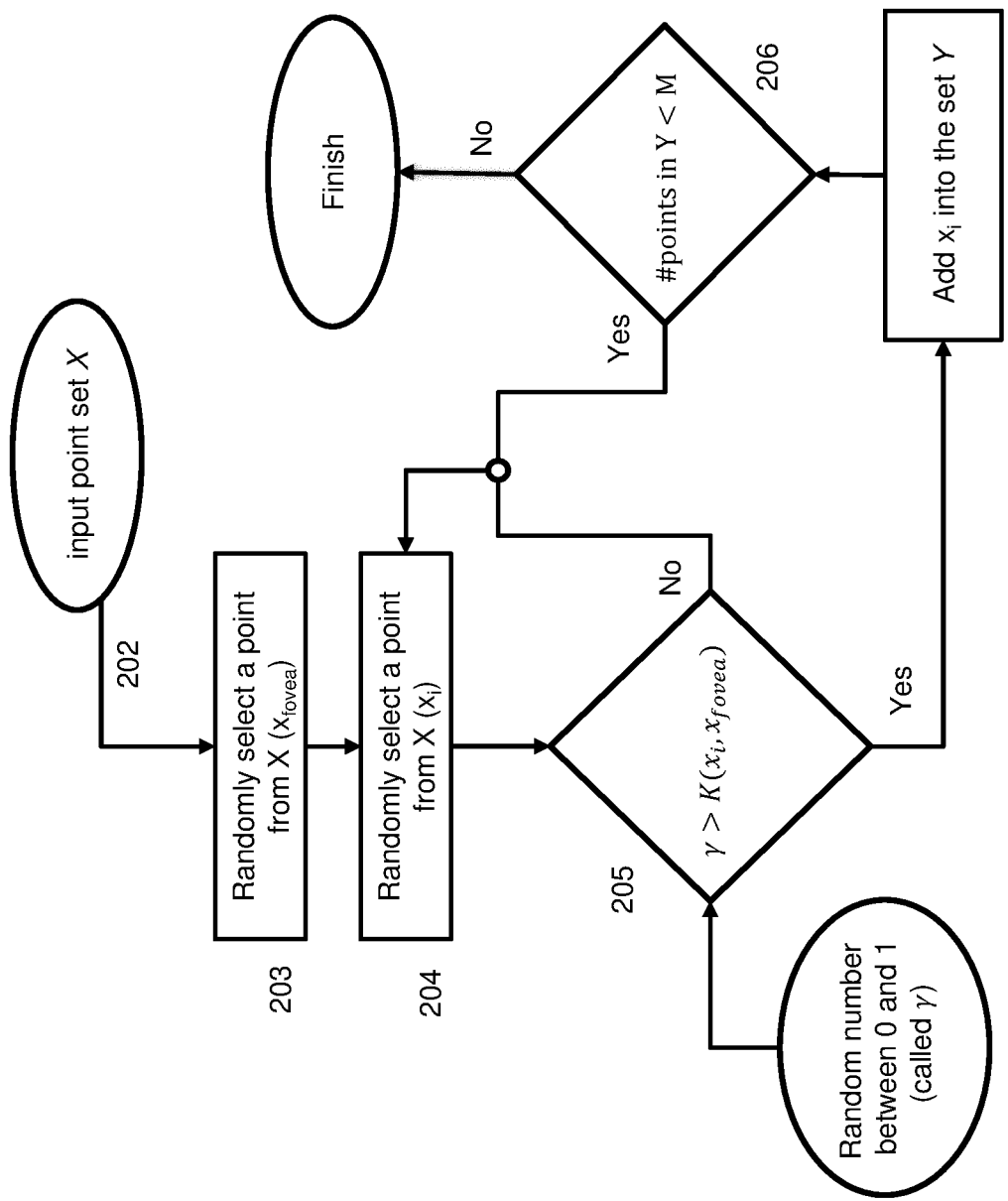
FIG. 2 depicts a flow diagram of a method for determining a non-uniform sample of a point cloud according to an embodiment of the invention.

The algorithm may be used to determine a non-uniform sample Y from point cloud X. FIG. 2 depicts a block scheme for determining a non-uniform sample Y comprising M points according to an embodiment of the invention. The algorithm may be implemented as a module comprising a memory comprising code portions and a processor for executing the code portions. As shown in FIG. 2, in a first step 202 the input of the module may consist of a non-Euclidian data set X, such as a point cloud or a 3D surface mesh. In a further step 203, a point (called fovea) from the non-Euclidian data set X may be selected randomly. The fovea point is added to the set Y as its first member. Then at 204, another point from the set X (called $x_i$) may be randomly selected and compared with the fovea according to the RBF kernel as described with respect to Equation 1. The value of the RBF kernel may be compared 205 with a random value drawn from a uniform distribution in range of 0 and 1. If the kernel value be greater than the random value, the selected point may be added to the set Y, otherwise it may be rejected. This procedure may continue until the set Y has M points 206. Depending on the bandwidth of such RBF kernel, the compactness of resampled data may vary. For example, if a bandwidth is chosen having a value significantly smaller then 1 (which is the variance of normalized point cloud) the resampling may be very compact and hence produce local patches. Reversely, with a chosen bandwidth significantly larger than a value of 1, the non-uniform resampling may closely approximate uniform resampling. In this sense patch extraction and uniform resampling may be considered as two special cases of such non-uniform resampling algorithm.

Figure 3:
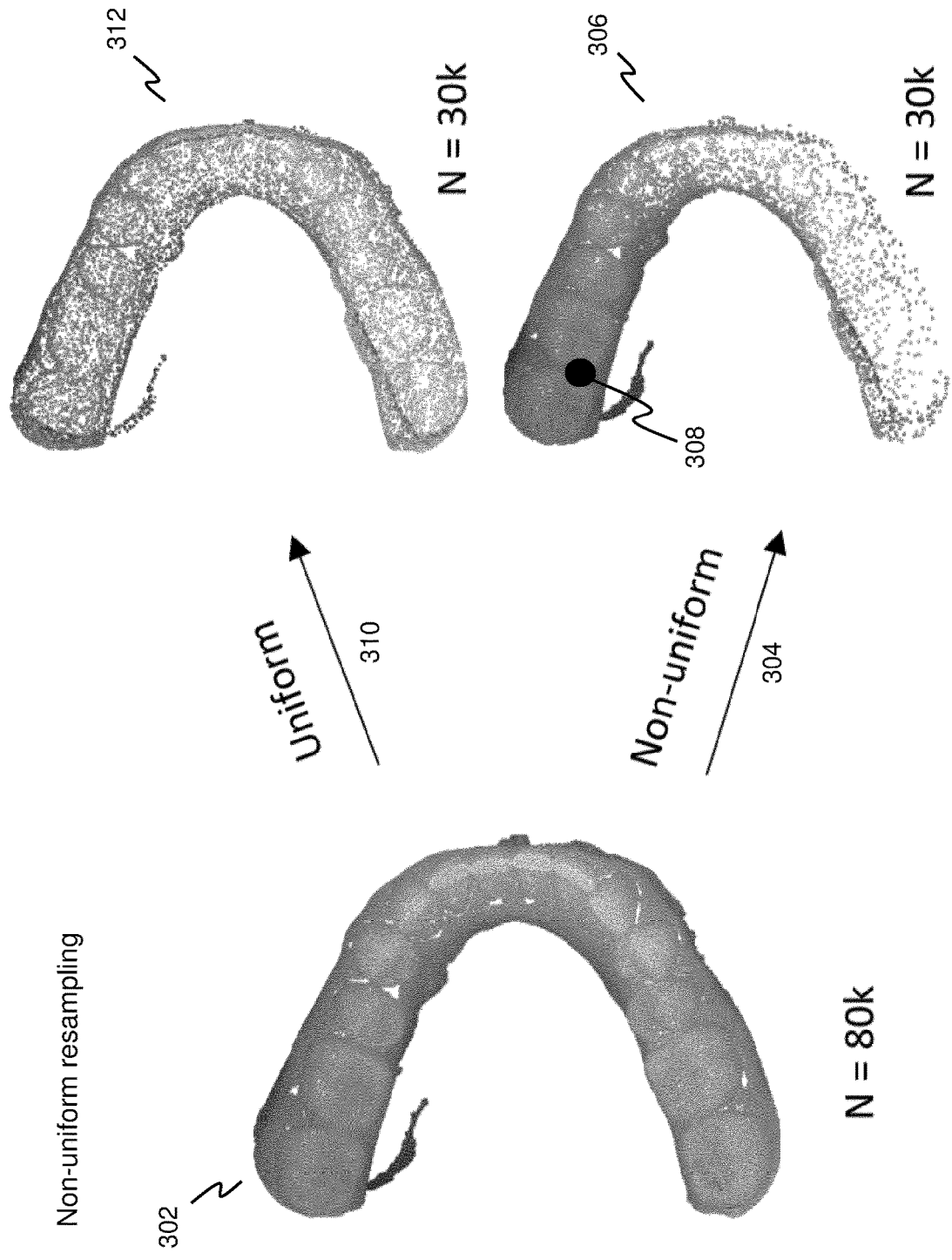
FIG. 3 illustrates a non-uniform resampling method according to an embodiment of the invention.

FIG. 3 illustrates the resampling of a point cloud using non-uniform resampling according to an embodiment of the invention. As shown in this figure, a high-resolution IOS point cloud 302 representation of a dentition comprising 80.000 points may be resampled based on a non-uniform resampling scheme 304, e.g. a non-uniform resampling scheme as described with reference to FIG. 2. The resampling may result in a first resampled subset 306 of 30.000 points wherein the resampling was based on e.g. selected point 308. For the purpose of this visualization, the figure also depicts a second resampled subset 312 of 30.000 points which may be obtained by applying a uniform resampling 310 to the point cloud. When comparing first and second resampled subset, the first resampled subset comprises different levels of granularity: a relatively dense regions of points around the fovea providing high-resolution local information on the part of the dentition at the position of the fovea and a relatively sparse region of points away from the fovea providing global information on the dentition. Resampled subsets based on non-uniform resampling for multiple foveas may be employed to train a deep neural network to learn both detailed local features as well as global features of a dentition.

Note that the above-described resampling scheme may be applied to other non-Euclidian 3D data sets, e.g. a 3D surface meshes. As an example, in cases where faces are defined composing a surface, such faces may be represented by a most representative point (e.g. a point at the average positions of all points describing such face). Effectively this would reduce a set of faces to a set of representative points upon which the described methods may be applied.

Figure 4:
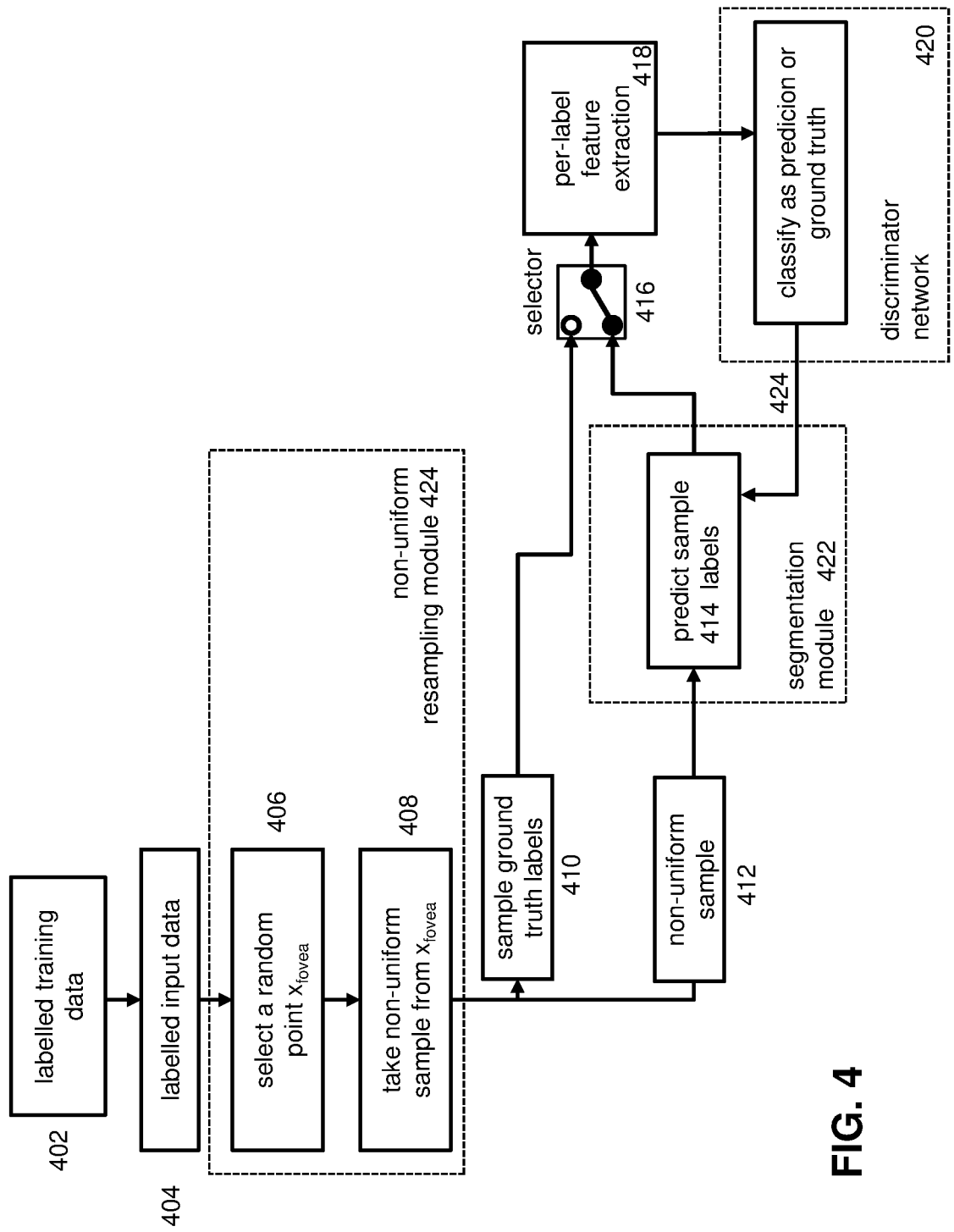
FIG. 4 illustrates a method of training a deep neural network according to an embodiment of the invention.

FIG. 4 illustrates a method of training a deep neural network according to an embodiment of the invention. In particular, the figure depicts a flow diagram of training a deep neural network for classification and segmentation of, in the case of this exemplary embodiment, dento-maxillofacial 3D image data according to an embodiment of the invention. As shown in the figure, a discriminator 3D deep learning neural network 420 may be used in an adversarial training setting, with the goal of improving the training quality of the segmentation 3D deep learning neural network of the segmentation module 422 which will be used for the semantic segmentation of point cloud data as described with reference to FIG. 6.

For the training procedure, training data is used in order to train a 3D deep learning neural network so that it is able to automatically perform semantic segmentation from 3D optical scanning data of a dento-maxillofacial structure. The computer may extract point clouds and/or surface normals, i.e. elements associated with coordinate values in 3D space, from 3D surface meshes of the dento-maxillofacial structure on the basis of the optical scanning data. For all 3D image data in the training data 402, a corresponding ground truth class label 410 is assigned for each point in the 3D image data, as may be determined by a dental professional.

During training, labelled 3D image data belonging to a single dento-maxillofacial structure 404 may be randomly selected from the training data stack of labelled dento-maxillofacial 3D image data 402. Then a point $x_{fovea}$ 406 may be randomly chosen from the point cloud represented in 404, and a set of M elements may be selected based on point $x_{fovea}$ according to the non-uniform resampling scheme 408 (as described in detail with respect to FIG. 2). This set of M elements can then either be directly fed forward together with their ground truth labels 410 to a feature extractor 418 or can be fed to the input of the semantic segmentation 3D deep learning neural network 422, which outputs a prediction of the labels 414. Whether the ground truth or predicted labels are chosen (via selector 416) may be determined with equal chance at each training iteration. The set of M elements and their (ground truth or predicted) labels are then fed into a feature extractor 418, which groups the elements based on their label and extrapolates features from each group of elements. These features may include for example a mean and a variance of each class (group of elements with the same label), in particular mean and variance values of a location of each class (group of elements with the same label) in the 3D space. Features of specific classes, e.g. the gingiva, may be omitted from calculation due to a detrimental contribution to the desired performance.

The set of all features for all classes may then be fed as input to a discriminator network 420. The function of such discriminator network may be to determine if the input features are associated with the ground truth (the target labels) or the labels 414 predicted by the segmentation network. Afterwards, the feedback (loss) from the discriminator performance is used to improve both the discriminator network 420 and segmentation network of the segmentation module 422. For example, if the discriminator network receives a negative feedback for failing its classification task, the segmentation network may receive a feedback of equal amount, but positive.

Training a segmentation network by computing a conventional equally weighted loss for each point in the input non-uniform resampled data is not efficient. As the resampled point set contains various levels of granularity, equally penalizing the output errors for dense and sparse regions prevents the model from optimally adapting its convolutional kernels to capturing the fine-detailed content in the data, as the error on sparse points increases relatively equally.

Figure 5:
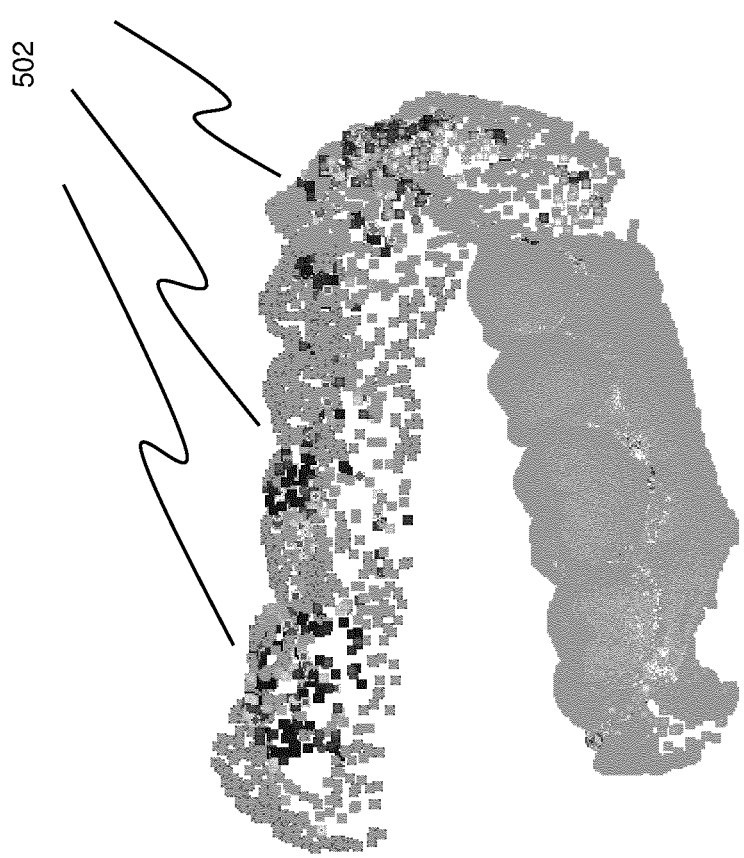
FIG. 5 illustrates implications of sampling as may be utilized in an embodiment of the invention.

This effect is illustrated in FIG. 5, where the certainty of label classification is presented for each point, predicted by the network with an equally weighted loss function. The points shown in darker color 502 are points whose label prediction was uncertain according to the trained deep neural network. As expected, the sparse regions with low sampling rate (on the upper part side the image) exhibit low classification certainty (i.e. will often be miss-classified by a trained network) because the lack of data in the sparse regions makes it difficult for the model to perform as accurately as it performs in dense regions. In order to optimize the performance of the learning algorithm, a trade-off may need to be found, e.g. by means of parameter tuning, between preservation of the sparse points (which contain the global dental arch structure) and utilization of the fine-curvature in IOS data. To that end, in an embodiment, a weight may be applied to each point. This weight may be computed based on the distance metric of the RBF kernel as defined by equation (1) above.

By assuming a posterior probability vector ($P_i$) for point i, which may be computed at the output softmax layer of the segmentation network with the transfer function of S and its parameters $\theta_S$, a weighted loss value ($L_p$) for each point i may be formulated by the following expression:

$$P_i = [p_{i1}, \ldots, p_{iL}] = S(x_i, \theta_S), \text{ where} \quad (2)$$

$$\sum_{j=1}^{L} p_{ij} = 1 \text{ with } 0 \leq p_{ij} \leq 1,$$

-continued $$\mathcal{L}_p = -\sum_{i=1}^{M} w_i \cdot \sum_{j=1}^{L} y_i \cdot \log(p_{ij}), \text{ and } w_i = \mathcal{K}(x_i, x_{fovea}),$$

wherein $y_i$ represents the one-hot encoded target label for the point i with $x_i$ in 3D coordinates, wherein L denotes the number of labels and M the number of resampled points. In the experiments in this application L=17 and M=3·10⁴ number.

Training the segmentation network only by applying a conventional point-wise cross-entropy loss function has an important shortcoming. The label of each point in the point cloud has a high dependency to the label of its adjacent points. For example, if a point belongs to an incisor tooth, its adjacent points can only belong to the same or another incisor, a canine tooth or to the gingiva, but certainly not belong to a molar tooth. Although such a strong structural constraint exists in the data, it is ignored when the optimization problem is formulated on the basis of equation (2). As a semantic segmentation is inherently not a pixel-based (point-wise) classification problem, a formulation of the optimization problem based on equation (2) is therefore ill-posed.

In order to counter this problem, a discriminator network may be used to discriminate between labels generated by the segmentation network and the (real) target labels. Additionally, an embedded loss (distance between the features of the hidden layer in the discriminator network) is proposed for increased training stability. Furthermore, instead of training a discriminator network directly based on the input space (i.e. point cloud and associated labels) and defining an embedded loss based on the predicted output, which would require a time- and processing-heavy training scheme, one or more statistical parameters may be computed based on the predicted and real labels by a feature extractor. These parameters may be used to quickly and efficiently train the discriminator network.

The statistical parameters may include a mean and a variance of the coordinates of all points (or at least a substantial part thereof) with the same label, as given by the segmentation network or ground-truth labels. These parameters may be expressed in the following way:

$$\hat{\mu}_j = \sum_{j=1}^{L-1} p_{ij} \cdot x_i \text{ and } \hat{\sigma}_j^2 = \sum_{j=1}^{L-1} p_{ij} \cdot (x_i - \hat{\mu}_j)^2, \quad (3)$$

$$\hat{u}_{(L-1)\times 6} = [\hat{\mu}_1, \hat{\sigma}_1^2 \| \hat{\mu}_2, \hat{\sigma}_2^2 \| \ldots \| \hat{\mu}_{L-1}, \hat{\sigma}_{L-1}^2]. \quad (4)$$

wherein the symbol "∥" denotes a vertical vector concatenation (stacking) operation and L denotes the number of labels in data. The stacked feature set (û) may represent a soft computation of central positions of teeth in a dentition and their variance (i.e. their soft bounding boxes) in the 3D space, according to the predicted labels ($p_{ij}$). The statistical mean and variance may be computed only for L–1 classes, such as those belonging to teeth. By replacing the $p_{ij}$ values in equation (3) with the one-hot encoded values of the ground truth labels ($y_i$), the counterpart feature-set of (û), denoted by (u), may be obtained. For any absent label in the point cloud, a vector of zeros may be inserted. The feature set (u) represents a realistic statistical measurement of the labelled data.

Figure 6:
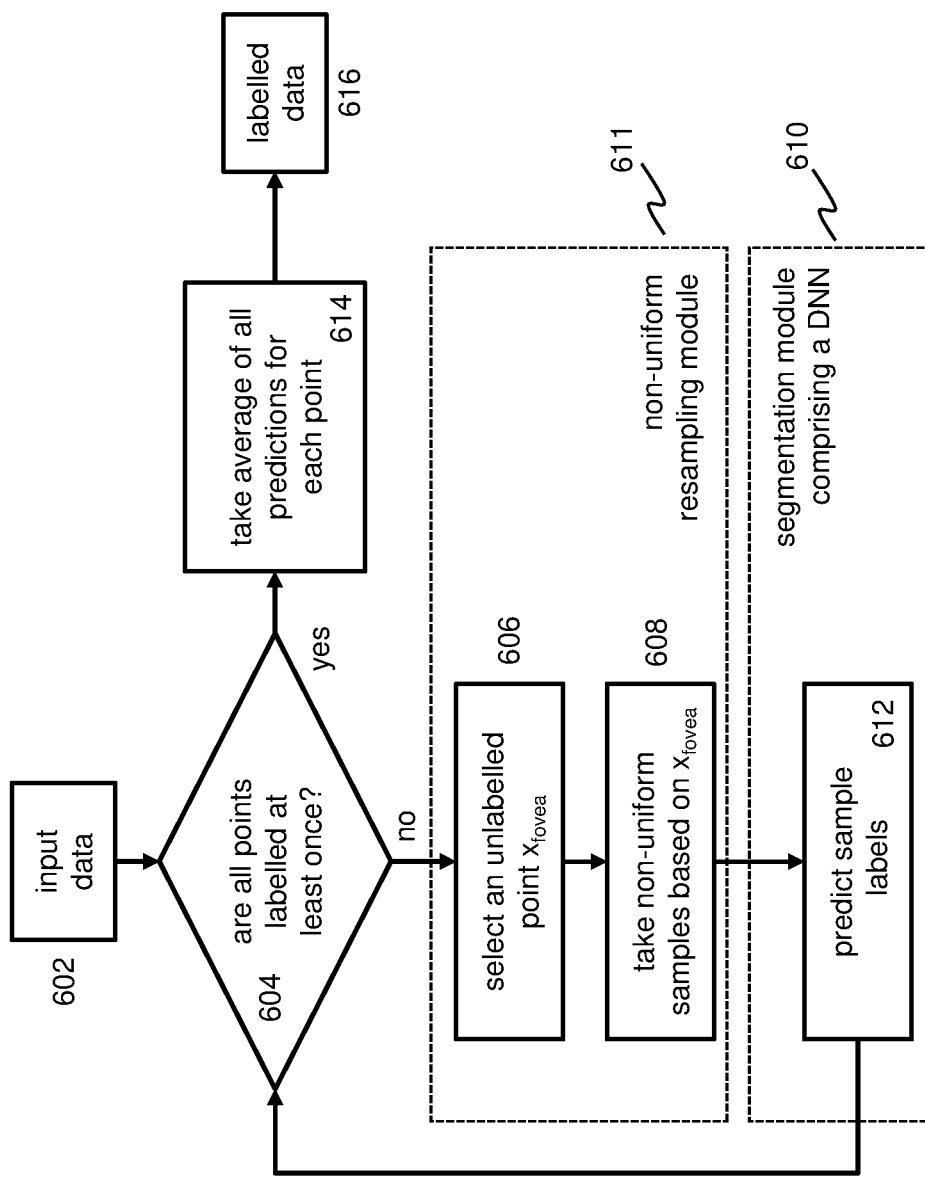
FIG. 6 schematically depicts a computer system for classification and segmentation of 3D dento-maxillofacial structures according to an embodiment of the invention.

FIG. 6 schematically depicts a computer system for classification and segmentation of 3D dento-maxillofacial structures according to an embodiment of the invention. In particular, the computer system may be configured to receive a 3D image data 602 of a dento-maxillofacial structure. The structure may include gingiva- and individual teeth crowns-structure. The 3D image data may comprise point clouds and/or surface normals, i.e. elements associated with coordinate values in 3D space. Preferably the 3D image data may include a IOS image data according a predetermined format, e.g. a triangular mesh format or a derivative thereof. The computer system may comprise a pre-processor for pre-processing the 3D image data into a point cloud.

Afterwards, a prediction cycle may be started, which continues until all elements of the point cloud have been assigned at least one predicted label: if there are still unlabelled elements, one random unlabelled element $x_{fovea}$ is chosen 606, and a set of M elements is taken from around $x_{fovea}$ according to the non-uniform resampling 608 as described with respect to FIG. 2. The combination of 606 and 608 may be considered a non-uniform resampling module 611. The set of M elements is fed to the input of a first 3D deep learning neural network 610, which has been trained to produce a semantic segmentation, i.e. a label probability 612 for each element of M to belonging to each possible class (as is described with respect to FIG. 4). If all elements of the point cloud have been assigned at least one predicted label, an average of all the label probabilities 614 may be taken for each element of the point cloud, and the most probable class may be selected for each element to obtain labelled data 616

The system depicted in FIGS. 1 and 4 may include at least two deep learning networks: a segmentation network and a discriminator network. The segmentation network may be based on any deep learning network architecture that is capable of analyzing a point cloud taking into account spatial correlations between different points of the point cloud. In an embodiment, the semantic segmentation network may be based on the PointCNN model.

Figures 7A, 7B:
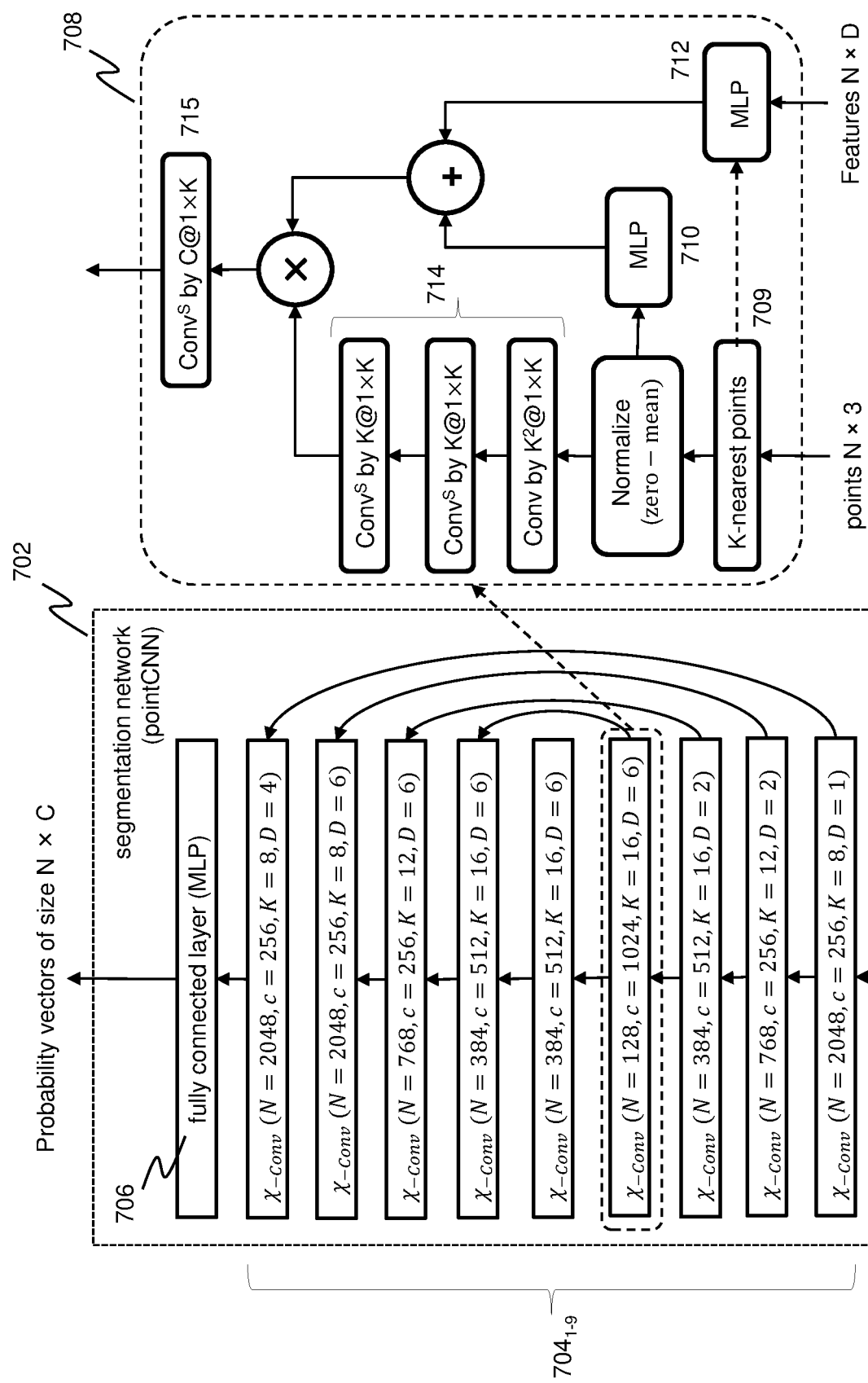
FIG. 7 shows a neural network architecture for segmentation as may be utilized in an embodiment of the invention.

A schematic of such deep neural network is depicted in FIGS. 7A and 7B. As shown in FIG. 7A, the PointCNN model 702 is based on a stack of χ-Conv operators 704$s$ which weights and permutes the input points and their corresponding features, prior to processing them by a conventional convolution operator. The structure of a χ-Conv operator is depicted in more detail in FIG. 7B. A χ-Conv operator may be controlled by the parameters N, c, K and D, wherein N defines the number of points of the resampled point cloud that is fed to the input of the segmentation module. The field of view of each χ-Conv operator includes a fixed set of K-nearest neighbour (KNN) points 709. Additionally, the χ-Conv operator may include two MLP networks 710, 712. These two MLP networks learn a χ-transformation of K×K for the coordinates of K input points. The outcome of the χ-Conv operation is the aggregation and projection of KNN point features into a representative set of points, after which a typical convolution is applied to them.

The PointCNN model depicted in FIG. 7 is capable of learning local correlations from data represented in the point cloud. Additionally, the PointCNN model has a considerably lower amount of learning parameters in comparison with other deep learning models for point clouds. This is beneficial for our case study, because it is less prone to severe overfitting on a small dataset. The inputs to the segmentation network may be the resampled points and its output is a multi-element vector for each point, wherein each element of the vector represents a class probability. For example, in an embodiment, the multi-vector element may comprise 17 elements representing 16 tooth classes and the gingiva. The discriminator network aims to discriminate feature set u from (û). In an embodiment, the discriminator network may be configured as a deep convolutional neural network.

Figure 8:
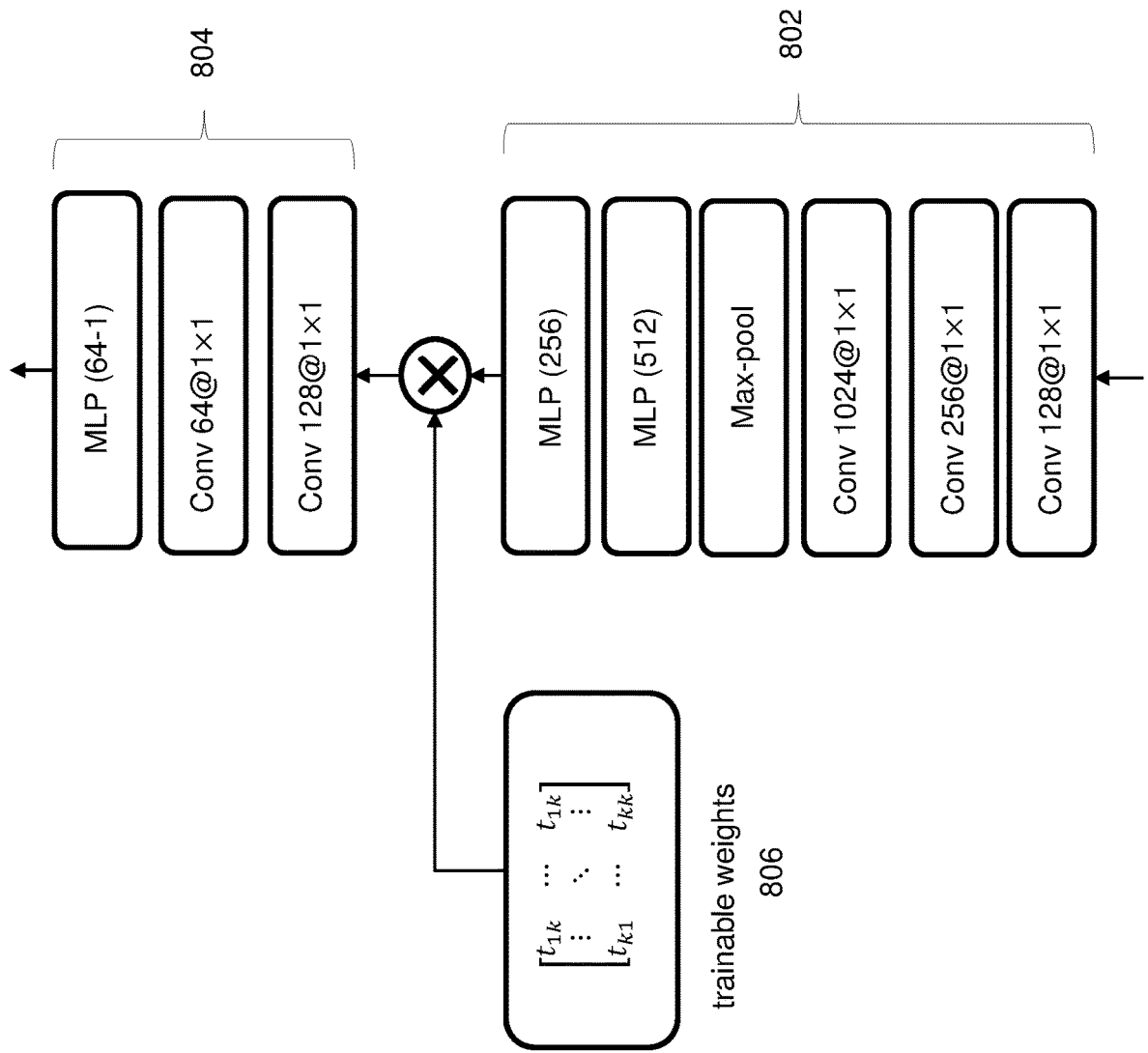
FIG. 8 illustrates a discriminator network as may be utilized in an embodiment of the invention.

An example of a discriminator network is depicted in FIG. 8. As shown in this figure, the network may comprise two cascaded parts 802, 804. The first part 802 estimates an affine transformation applied on the input 96-element vector. The second part 804 includes a MLP network, in this example a 3-layer MLP network, which maps the transformed input vector into a scalar value by a sigmoidal activation function at its output node. The network may be trained to produce the scalar 1 at its output if the network is applied to (u), while the scalar 0 may be produced if the network is applied to (û).

In an adversarial setting for training the discriminator network D and the segmentation network S, the discriminator loss ($L_D$) for the network D with parameters $\theta_D$ and an adversarial loss for the network S, may be defined by the following expression:

$$\mathcal{L}_D(u,\hat{u};\theta_D,\theta_S) = -\log D(u) - \log(1-D(\hat{u})), \quad \mathcal{L}_{Adv}(\hat{u};\theta_D,\theta_S) = -\log D(\hat{u}). \tag{5}$$

Hence, the total loss for the segmentation network is a contribution of the losses $L_p$ as defined by equation (2) and $L_{Adv}$ as defined by equation (5). To avoid hyper-parameter tuning for the contribution weights (λ) between two loss terms, adaptive loss weighting may be used. After initializing the $\lambda = [\lambda_1, \lambda_2]$ with a vector of unity values, the regularization term R(λ) may be added to the total loss function for the segmentation network (S), as defined by the following expression:

$$\mathcal{L}_S = \frac{1}{\lambda_1^2} \cdot \mathcal{L}_p + \frac{1}{\lambda_2^2} \cdot \mathcal{L}_{Adv} + \mathcal{R}(\lambda), \text{ where } \mathcal{R}(\lambda) = \lambda_1^2 \cdot \lambda_2^2. \tag{6}$$

Once the segmentation network is trained in the above described way, the system may be configured in its inference modus as described with reference to FIG. 1B above. The segmentation network is trained on the non-uniform resampled data, therefore in order to predict labels for the whole point cloud several subset of points need to be formed based on the non-uniform resampling algorithm as described above with reference to FIGS. 2 and 3. The prediction of all points in the point cloud may be obtained by aggregating the predicted labels for each of the subsets. The pseudocode of the algorithm is provided in table 2:

TABLE 2 inference on the whole point cloud.
Algorithm 2: Inference on the whole point cloud input : point cloud
output: predicted label per point
X ← {$x_1, x_2, \ldots, x_N$}  // whole point cloud TABLE 2-continued inference on the whole point cloud.
Algorithm 2: Inference on the whole point cloud

```
Function Inference(X):
|  U ← ∅                             // initialized empty set
|  P_x ← 0_{N×17}                    // initialized probability vectors
|  while |U| < |X| do
|  |  x_f ~ {x ∈ X | x ∉ U}          // select fovea out of unprocessed points
|  |  Y ← R(x_f, X)                  // non-uniform resampling (Algorithm 1)
|  |  P_Y = S(Y, θ_S)                // prediction of S Net.
|  |  {x_i} ← {x ∈ Y | K(x_f, x) < σ} // only dense region is valid
|  |  P_x(x_i) = P_x(x_i) + P_Y(x_i)  // Aggregate the probabilities
|  |  U ← {x_i} ∪ {U}                // Mark as processed
|  end
|  return argmax(P_X)
```

Experiments were conducted to test the performance of the system. The training data included 120 optical scans of dentitions from 60 adult subjects, each containing one upper and one lower jaw scan. The dataset includes scans from healthy dentition and different type of abnormalities among subjects. The IOS data was generated using a 3Shape d500 optical scanner (3Shape AS, Copenhagen, Denmark). On average, each IOS point cloud comprises 180.000 points (varying in between 100.000 and 310.000). All optical scan meshes were manually segmented and their respective points were categorized into one of the 32+1 classes by a dental professional and reviewed and adjusted by one dental expert (DAM) with Meshmixer 3.4 (Autodesk Inc, San Rafael CA, USA). Labelling of the tooth categories was performed according to the international tooth numbering standard, Federation Dentaire Internationale (FDI). Segmentation of each optical scan takes approximately 45 minutes on average, which shows its intensive laborious task for a human.

The performance of the model was evaluated by 5-fold cross validation and the results are compared by the average Jaccard Index, also known as intersection over union (IoU). Additional to the IoU, the precision and recall for the multi-class segmentation problem is reported. For computing the precision and recall, each class treats individually (one versus all), as a binary problem and finally the average score are reported. The experiments were partitioned into three parts: (1) benchmarking the performance of the PointCNN network in comparison with two other state-of-the-art deep learning models on IOS segmentation. These models include PointNet (Qi et al., 2017) and PointGrid (Le and Duan, 2018); (2) Evaluating the impact of applying the non-uniform resampling versus using the naive uniform resampling. For a fair comparison, the number of resampled points are kept equal (M=30.000); (3) evaluating the effectiveness of involving the adversarial loss.

All models are trained by the stochastic gradient descent and Adam learning adaptation technique for 1000 epochs. The initial learning rate is equal to 5e–3 which decreases each 20K iterations by the factor of 0.9. Since the point cloud is normalized to have unit variance (by adjusting σ to 0.4 in equation (1)).

TABLE 3

The performance of our proposed model
with different experimental setups, along with state

| Method | | | | | | |
|---|---|---|---|---|---|---|
| Network Arch. | Non-uniform | Adv. setting | IoU | Precision | Recall | Exec. time (sec.) |
| PointNet (Qi et al., 2017) | — | — | .76 | .73 | .65 | 0.19 |
| PointGrid (Le and Duan, 2018) | — | — | .80 | .75 | .70 | 0.88 |
| PointCNN (Li et al., 2018)* | — | — | .88 | .87 | .83 | 0.66 |
| Ours (I) | ✓ | — | .91 | .90 | .87 | 6.86 |
| Ours (II) | — | ✓ | .91 | .91 | .89 | 6.86 |
| Ours (III) | ✓ | ✓ | .94 | .93 | .90 | 6.86 |

Table 3 shows the obtained results under different experimental setups. Examples of predicted labels for IOS point cloud generated by the model as provided in FIG. 9-11. As can be observed from the Table 3, the PointCNN performs better than two other state-of-the-art models when a naive uniform sampling is used. This is mostly because of the χ-Conv operator in the PointCNN being capable of using spatial-correlation information of points in the point cloud. Additionally, PointCNN uses relatively few of parameters so that the system is less prone to overfitting. The PointGrid samples points of the point cloud inside a predefined grid and uses convolutional operators to predict labels. In this case however, its performance is limited to the spatial resolution of the spatial quantization grid. Moreover, PointNet model ignores the spatial correlation between points in the point cloud. The results on the PointCNN in table 3 illustrate the effectiveness of using non-uniform sampling and/or adversarial loss. Both techniques individually improve the performance of the PointCNN. The combination of non-uniform sampling and adversarial loss provides the highest performance. The accuracy of the system is illustrated by the semantically segmented IOS point cloud data depicted in FIG. 8-11.

Figure 9:
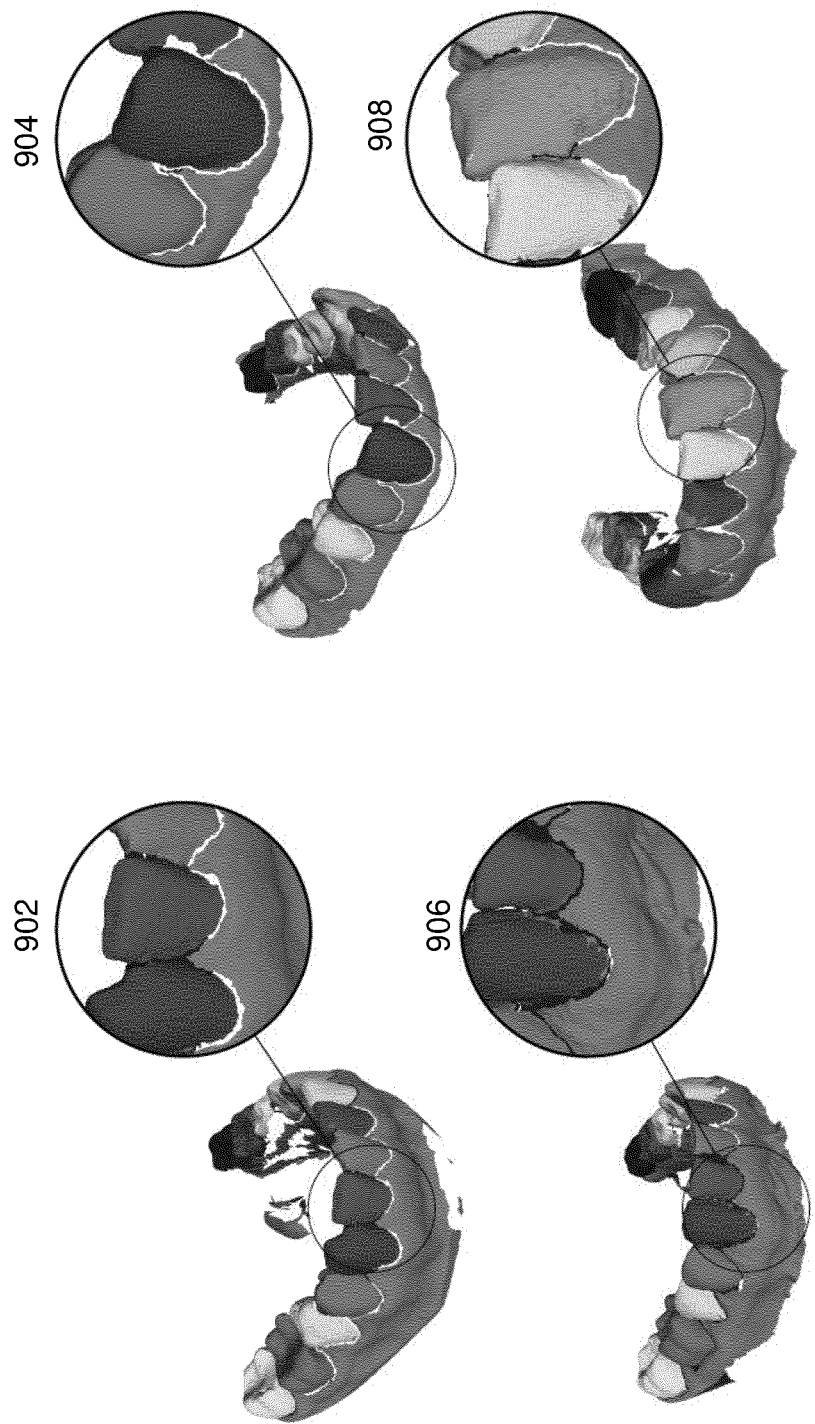
FIG. 9 depicts examples of segmented point cloud data by a system according to an embodiment of the invention.
Figure 10B:
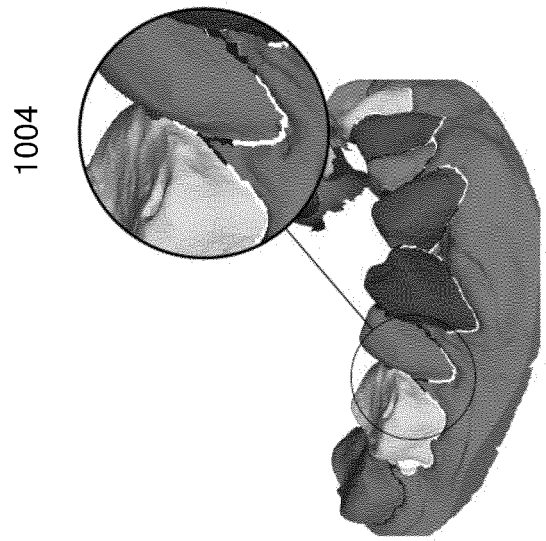
FIG. 10 depicts examples of segmented point cloud data for the purpose of illustrating accuracy.
Figure 10A:
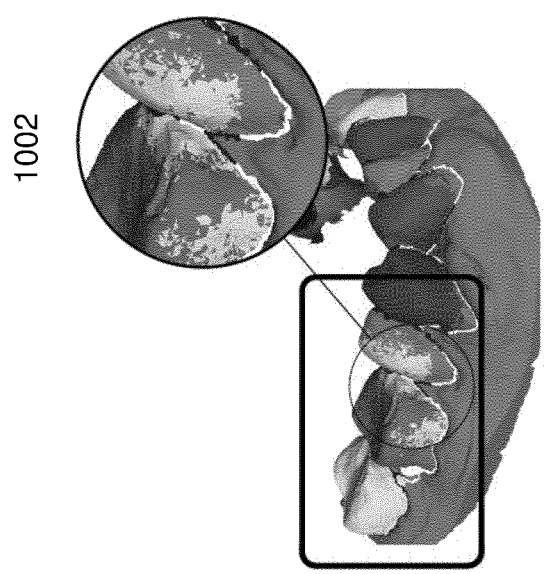

FIG. 9 depicts illustrations of 3D dento-maxillofacial image data, more specifically data as may be derived from intra-oral scans, labelled as predicted by an embodiment of the invention, more specifically an embodiment incorporating a discriminator network as described with respect to FIGS. 4 and 8, during training. All four dento-maxillofacial images are held-out samples (samples not used during training). For the purpose if these visualizations, labelling as was applied to point clouds representing meshes was applied back to the representative faces of the surface meshes of intra-oral scans. Detailed sections 902-908 show the accuracy of the segmentations, especially in areas that may be considered difficult such as the borders between teeth, and between teeth and gingiva FIG. 10A shows examples of 3D dento-maxillofacial image data labelled as predicted by a segmentation network which has been trained without the support of a discriminator network. As shown in the highlighted circle 1002 the segmentation network as trained without such discriminator incorrectly predicted labels for four different tooth objects across three teeth. For comparison, in FIG. 10B, the same dento-maxillofacial 3D image data is shown with ground truth labelling. Results as can be seen with respect to FIG. 9, utilizing training with employing a discriminator as described with respect to FIGS. 4 and 8, may be considered highly accurate when compared to ground truth labels, especially in border regions 1004.

Figure 11:
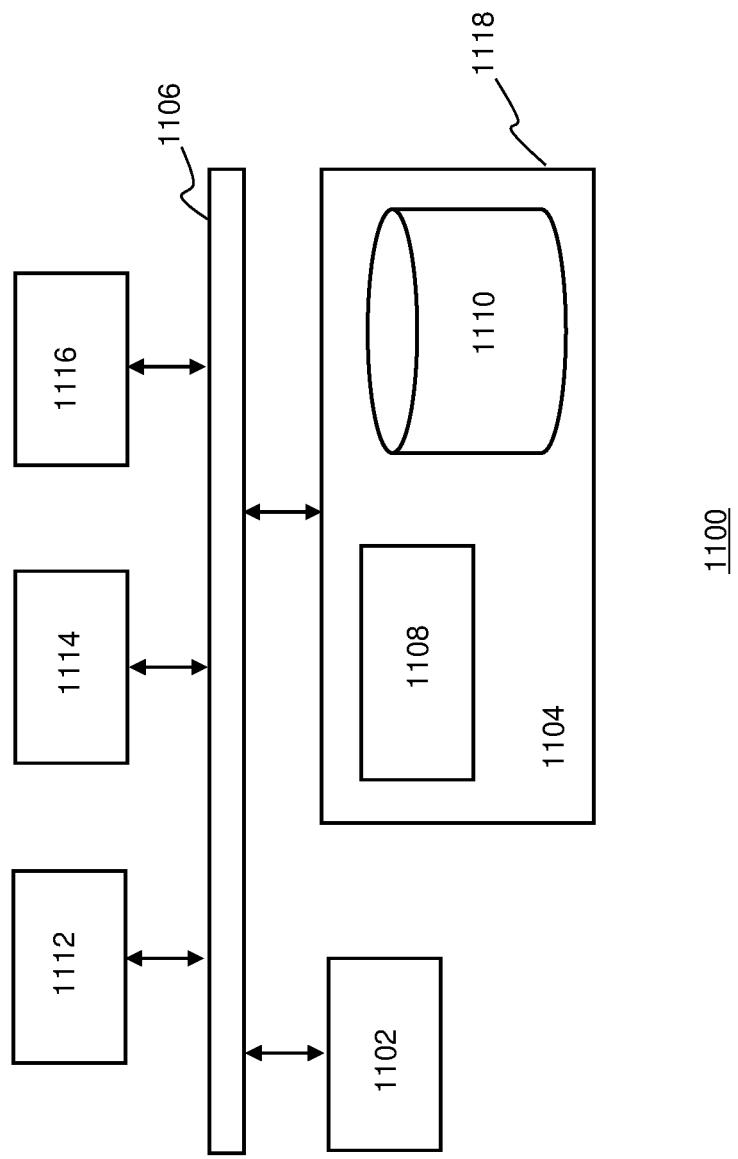
FIG. 11 is a block diagram illustrating an exemplary data computing system that may be used for executing methods and software products described in this disclosure.

FIG. 11 is a block diagram illustrating exemplary data processing systems described in this disclosure. Data processing system 1100 may include at least one processor 1102 coupled to memory elements 1104 through a system bus 1106. As such, the data processing system may store program code within memory elements 1104. Further, processor 1102 may execute the program code accessed from memory elements 1104 via system bus 1106. In one aspect, data processing system may be implemented as a computer that is suitable for storing and/or executing program code. It should be appreciated, however, that data processing system 1100 may be implemented in the form of any system including a processor and memory that is capable of performing the functions described within this specification.

Memory elements 1104 may include one or more physical memory devices such as, for example, local memory 1108 and one or more bulk storage devices 1110. Local memory may refer to random access memory or other non-persistent memory device(s) generally used during actual execution of the program code. A bulk storage device may be implemented as a hard drive or other persistent data storage device. The processing system 1100 may also include one or more cache memories (not shown) that provide temporary storage of at least some program code in order to reduce the number of times program code must be retrieved from bulk storage device 1110 during execution.

Input/output (I/O) devices depicted as input device 1112 and output device 1114 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening 1/O controllers. A network adapter 1116 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1100.

As pictured in FIG. 11, memory elements 1104 may store an application 1118. It should be appreciated that data processing system 1100 may further execute an operating system (not shown) that can facilitate execution of the application. Application, being implemented in the form of executable program code, can be executed by data processing system 1100, e.g., by processor 1102. Responsive to executing application, data processing system may be configured to perform one or more operations to be described herein in further detail. In one aspect, for example, data processing system 1100 may represent a client data processing system. In that case, application 1118 may represent a client application that, when executed, configures data processing system 1100 to perform the various functions described herein with reference to a "client". Examples of a client can include, but are not limited to, a personal computer, a portable computer, a mobile phone, or the like. In another aspect, data processing system may represent a server. For example, data processing system may represent an (HTTP) server in which case application 1118, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for semantic segmentation of a point cloud comprising:
   receiving a point cloud, the point cloud including points in a 3D space, the points representing a predetermined object, the predetermined object representing a dento-maxillofacial structure, the dento-maxillofacial structure including a dentition comprising teeth;
   determining subsets of points based on the point cloud using a non-uniform resampling algorithm, wherein the determining of each of the subsets of points includes:
   randomly selecting a point from the point cloud and determining a first number of points arranged within a predetermined spatial distance of the randomly selected point of the point cloud and a second number of points arranged at spatial distances larger than the predetermined spatial distance, the first number of points representing one or more local features of the predetermined object around the selected point and the second number of points representing one or more global features of the predetermined object; and providing points of the subsets of points to an input of a deep neural network, DNN, the deep neural network being trained to semantically segment the points of the subsets of points that are provided to the input of the DNN according to a plurality of classes associated with the predetermined object, and, for each point of the subsets of points that is provided to the input of the DNN, receiving a multi-element vector at an output of the DNN, wherein each element of the multi-element vector represents a probability that the point belongs to one of the plurality of classes of the predetermined object.

2. The method according to claim 1, wherein the determining of each of the subsets of points includes:

randomly selecting a point from the point cloud;

determining the first number of points by sampling points of the point cloud which are positioned within the predetermined spatial distance from the randomly selected point and determining the second number of points by sampling points of the point cloud which are positioned at a distance larger than the predetermined spatial distance from the randomly selected point; and combining the first number of points and second number of points into a subset of points.

3. The method according to claim 1 wherein the predetermined spatial distance is determined based on a random number.

4. The method according to claim 1 wherein the predetermined spatial distance is based on a weighted distance function.

5. The method according to claim 4 wherein the weighted distance function is an exponential function, the weighted distance function defining a radial basis kernel K (RBK) according to the expression:

$$\mathcal{K}(x_i, x_{fovea}) = \exp\left(-\frac{\|x_i - x_{fovea}\|^2}{2\sigma^2}\right), \quad (1)$$

where parameter σ is a free parameter that is used to control a bandwidth of a kernel, $x_i$ is the position of point i and $x_{fovea}$ is the position of the selected point, wherein the selected point is selected randomly.

6. The method according to claim 1 wherein the DNN is trained based on a training set comprising one or more point clouds, each of the one or more point clouds representing the predetermined object and each point of the one or more point clouds being associated with a target label.

7. The method according to claim 6, wherein a loss function is a weighted loss function ($L_p$), the loss function defining a weight to each point based on a weighted distance function $$\mathcal{K}(x_i, x_{fovea}) = \exp\left(-\frac{\|x_i - x_{fovea}\|^2}{2\sigma^2}\right), \quad (1)$$

where parameter σ is a free parameter that is used to control a bandwidth of a kernel, $x_i$ is the position of point i and $x_{fovea}$ is the position of the selected point, wherein the selected point is selected randomly.

8. The method according to claim 7 wherein the weighted distance function is based an exponential function.

9. The method according to claim 6 wherein the training of the DNN including determining the one or more subsets of the one or more point clouds using the non-uniform resampling algorithm and training parameters of the DNN by minimizing a loss function representing a deviation between labels predicted by the DNN and each of the target labels.

10. The method according to claim 1 wherein the DNN is trained based on a discriminator network, wherein the discriminator network is configured to distinguish between a target label and a label generated by the DNN.

11. The method according to claim 10 randomly providing the target label or the label generated by the DNN to the input of the discriminator network and in response, the discriminator network generating an indication whether the input of the discriminator network is associated with a target label or a label generated by the DNN.

12. The method according to claim 1 wherein the DNN comprising one or more multi-layer perceptron (MLP) networks and/or one or more χ-Conv operator layers of a pointCNN network.

13. A computer program product comprising software code portions configured for, when run in a non-transitory computer readable medium of a computer, executing the method steps according to claim 1.

14. A computer-implemented method for training a deep neural network DNN to semantically segment a point cloud, the method comprising:

a computer receiving training data, the training data comprising one or more point clouds, each of the one or more point clouds representing a predetermined object, the predetermined object representing a dento-maxillofacial structure, the dento-maxillofacial structure including a dentition comprising teeth and each point of the one or more point clouds being associated with a target label;

determining subsets of points based on each of the one or more point clouds of the training data using a non-uniform resampling algorithm, each of the subsets being associated with target labels, wherein the determining of each of the subsets includes: randomly selecting a point from the point cloud and determining a first number of points arranged within a predetermined spatial distance of a selected point of the point cloud and a second number of points arranged at spatial distances larger than the predetermined spatial distance, the first number of point representing one or more local features of the predetermined object around the selected point and the second number of points representing one or more global features of the predetermined object;

providing points of the subsets of points to an input of a deep neural network, DNN, and receiving for each point that is provided to the input of the DNN, a multi-element vector at an output of the DNN, wherein each element of the multi-element vector represents a probability that the point belongs to one of a plurality of classes of the predetermined object; and, training parameters of the DNN by minimizing a loss function representing a deviation between labels predicted by the DNN and the target labels.

15. The method according to claim 14 wherein the non-uniform resampling algorithm includes:
randomly selecting a point from a point cloud;
determining the first number of points by sampling points of the point cloud which are positioned within the predetermined spatial distance from the randomly selected point and determining the second number of points by sampling points of the point cloud which are positioned at a distance larger than the predetermined spatial distance from the randomly selected point; and
combining the first number of points and second number of points into a subset of points.

16. The method according to claim 12, wherein the loss function is a weighted loss function ($L_p$), the loss function providing a weight to each point based on a weighted distance function, the weighted distance function being based an exponential function.

17. The method according to claim 16, wherein the weighted distance function is an exponential function, the weighted distance function defining a radial basis kernel K (RBK) according to the expression:

$$\mathcal{K}(x_i, x_{fovea}) = \exp\left(-\frac{\|x_i - x_{fovea}\|^2}{2\sigma^2}\right), \quad (1)$$

where parameter σ is a free parameter that is used to control a bandwidth of a kernel, $x_i$ is the position of point i and $x_{fovea}$ is the position of the selected point, wherein the selected point is selected randomly.

18. The method according to claim 14 wherein the DNN is trained based on a discriminator network, the discriminator network being configured to distinguish between a target label and a label generated by the DNN.

19. The method according to claim 18 comprising:
a feedback module randomly providing a target label or a label generated by the DNN to a feature extraction module;
the feature extraction module determining one or more features based on the target label or label generated by the DNN and providing the one or more features to an input of the discriminator network;
in response the discriminator network generating an indication whether the one or more features are associated a target label or a label generated by the DNN; and
providing the indication to the input of the DNN.

20. A computer system configured to semantically segment a point cloud comprising:
a computer readable storage medium having computer readable program code embodied therewith, the program code including a non-uniform sampling module and at least a trained deep neural network DNN, the computer readable program code; and a processor, the processor representing a microprocessor, coupled to the computer readable storage medium, wherein responsive to executing the computer readable program code, the processor is configured to perform executable operations comprising:

receiving a point cloud, the point cloud including points in a 3D space, the points representing a predetermined object, the predetermined object representing a dento-maxillofacial structure, the dento-maxillofacial structure including a dentition comprising teeth;

determining subsets of points based on the point cloud using a non-uniform resampling algorithm, wherein the determining of each of the subsets of points includes: randomly selecting a point from the point cloud and determining a first number of points arranged within a predetermined spatial distance of the randomly selected point of the point cloud and a second number of points arranged at spatial distances larger than the predetermined spatial distance, the first number of points representing one or more local features of the predetermined object around the selected point and the second number of points representing one or more global features of the predetermined object; and providing points of the subsets of points to an input of a deep neural network, DNN, the deep neural network being trained to semantically segment the points of the subsets of points that are provided to the input of the DNN according to a plurality of classes associated with the predetermined object, and, for each point of the subsets of points that is provided to the input of the DNN, receiving a multi-element vector at an output of the DNN, wherein each element of the multi-element vector represents a probability that the point belongs to one of the plurality of classes of the predetermined object.

* * * * *